United States Patent
Lee et al.

(10) Patent No.: US 11,514,890 B2
(45) Date of Patent: Nov. 29, 2022

(54) METHOD FOR USER VOICE INPUT PROCESSING AND ELECTRONIC DEVICE SUPPORTING SAME

(71) Applicant: Samsung Electronics Co., Ltd., Gyeonggi-do (KR)

(72) Inventors: Youngwoo Lee, Gyeonggi-do (KR); Hoseon Shin, Gyeonggi-do (KR); Chulmin Lee, Gyeonggi-do (KR); Seungyeol Lee, Gyeonggi-do (KR); Taejin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 17/259,940

(22) PCT Filed: Jul. 12, 2019

(86) PCT No.: PCT/KR2019/008668
§ 371 (c)(1),
(2) Date: Jan. 13, 2021

(87) PCT Pub. No.: WO2020/013666
PCT Pub. Date: Jan. 16, 2020

(65) Prior Publication Data
US 2022/0139377 A1     May 5, 2022

(30) Foreign Application Priority Data
Jul. 13, 2018  (KR) .................... 10-2018-0081746

(51) Int. Cl.
*G10L 15/08*  (2006.01)
*G10L 25/87*  (2013.01)
*G10L 25/93*  (2013.01)

(52) U.S. Cl.
CPC .............. *G10L 15/08* (2013.01); *G10L 25/87* (2013.01); *G10L 25/93* (2013.01); *G10L 2015/088* (2013.01)

(58) Field of Classification Search
CPC ......... G10L 15/08; G10L 25/87; G10L 25/93; G10L 2015/088
(Continued)

(56) References Cited

U.S. PATENT DOCUMENTS 5,867,574 A    2/1999 Eryilmaz
6,453,041 B1   9/2002 Eryilmaz
(Continued)

FOREIGN PATENT DOCUMENTS

JP    2007-233148 A    9/2007
KR    10-1616112 B1    4/2016
(Continued)

OTHER PUBLICATIONS

I. Kramberger, M. Grasic and T. Rotovnik, "Door phone embedded system for voice based user identification and verification platform," in IEEE Transactions on Consumer Electronics, vol. 57, No. 3, po. 1212-1217, Aug. 2011, doi: 10.1109/TCE.2011.6018876. (Year: 2011) (Year: 2011).*

(Continued)

*Primary Examiner* — Bharatkumar S Shah
(74) *Attorney, Agent, or Firm* — Cha & Reiter, LLC

(57) ABSTRACT

According to an embodiment, disclosed is an electronic device including a speaker, a microphone, a communication interface, a processor operatively connected to the speaker, the microphone, and the communication interface, and a memory operatively connected to the processor. The memory stores instructions that, when executed, cause the processor to receive a first utterance through the microphone, to determine a speaker model by performing speaker
(Continued)

recognition on the first utterance, to receive a second utterance through the microphone after the first utterance is received, to detect an end-point of the second utterance, at least partially using the determined speaker model. Besides, various embodiments as understood from the specification are also possible.

10 Claims, 17 Drawing Sheets

(58) Field of Classification Search
USPC .......................................................... 704/200
See application file for complete search history.

(56) References Cited

U.S. PATENT DOCUMENTS

| | | | |
|---|---|---|---|
| 8,731,936 | B2 | 5/2014 | Brush et al. |
| 9,318,129 | B2 | 4/2016 | Vasilieff et al. |
| 10,147,429 | B2 | 12/2018 | Guevara et al. |
| 10,438,593 | B2 | 10/2019 | Guevara |
| 10,460,735 | B2 | 10/2019 | Guevara et al. |
| 10,535,354 | B2 | 1/2020 | Guevara |
| 10,789,945 | B2 * | 9/2020 | Acero ..................... G10L 13/04 |
| 2016/0189733 | A1 | 6/2016 | Vasilieff et al. |
| 2018/0012604 | A1 * | 1/2018 | Guevara ................. G10L 17/24 |
| 2019/0043525 | A1 * | 2/2019 | Huang .................... G10L 25/21 |
| 2019/0057716 | A1 | 2/2019 | Vasilieff et al. |

FOREIGN PATENT DOCUMENTS

| | | |
|---|---|---|
| KR | 10-2016-0055059 A | 5/2016 |
| KR | 10-2016-0110085 A | 9/2016 |
| KR | 10-1804388 B1 | 12/2017 |
| KR | 10-2018-0021531 A | 3/2018 |
| KR | 10-1859708 B1 | 5/2018 |

OTHER PUBLICATIONS

System and Method for Speech Recognition, An IP.com Prior Art Database Technical Disclosure, Authors et. al.: Dimitri Kanevsky, Tara Sainath, 2017 (Year: 2017).*

* cited by examiner

METHOD FOR USER VOICE INPUT PROCESSING AND ELECTRONIC DEVICE SUPPORTING SAME

CROSS REFERENCE TO RELATED APPLICATIONS

This application is a National Phase Entry of PCT International Application No. PCT/KR2019/008668, which was filed on Jul. 12, 2019, and claims a priority to Korean Patent Application No. 10-2018-0081746, which was filed on Jul. 13, 2018, the contents of which are incorporated herein by reference.

TECHNICAL FIELD

Various embodiments disclosed in the disclosure are related to a technology for processing a user voice input.

BACKGROUND ART

For the purpose of aiming the interaction with a user, recent electronic devices have suggested various input methods. For example, an electronic device may support a voice input scheme that receives voice data according to a user utterance, based on the execution of a specified application program. Furthermore, the electronic device may recognize the received voice data to derive the intent of the user utterance and may perform a functional operation corresponding to the derived intent of the user utterance or support a speech recognition service for providing content.

DISCLOSURE

Technical Problem

In an operation of receiving voice data according to a user utterance, an electronic device may preprocess the voice data. For example, the electronic device may determine the section of the received voice data by detecting the end-point of the user utterance. However, when noise (e.g., audio of a sound medium, voices of other people, or the like) is present in the operating environment of the electronic device, noise data according to the noise may be mixed with a user's voice data in the electronic device. This may lower the preprocessing or recognition efficiency for the user's voice data.

Various embodiments disclosed in the disclosure may provide a user voice input processing method capable of clearly recognizing voice data according to the user utterance, and an electronic device supporting the same.

Technical Solution

According to an embodiment, an electronic device may include a speaker, a microphone, a communication interface, a processor operatively connected to the speaker, the microphone, and the communication interface, and a memory operatively connected to the processor.

According to an embodiment, the memory may store instructions that, when executed, cause the processor to receive a first utterance through the microphone, to determine a speaker model by performing speaker recognition on the first utterance, to receive a second utterance through the microphone after the first utterance is received, to detect an end-point of the second utterance, at least partially using the determined speaker model.

Advantageous Effects

According to various embodiments, the recognition rate of voice data according to a user utterance or the reliability of speech recognition service may be improved.

According to various embodiments, the time required for an electronic device to respond to the user utterance may be shortened, and a user's discomfort according to a response waiting time may be reduced, by excluding noise data upon processing the user utterance.

Besides, a variety of effects directly or indirectly understood through the specification may be provided.

DESCRIPTION OF DRAWINGS

With regard to the description of drawings, the same reference numerals may be assigned to the same or corresponding components.

MODE FOR INVENTION

Figure 1A:
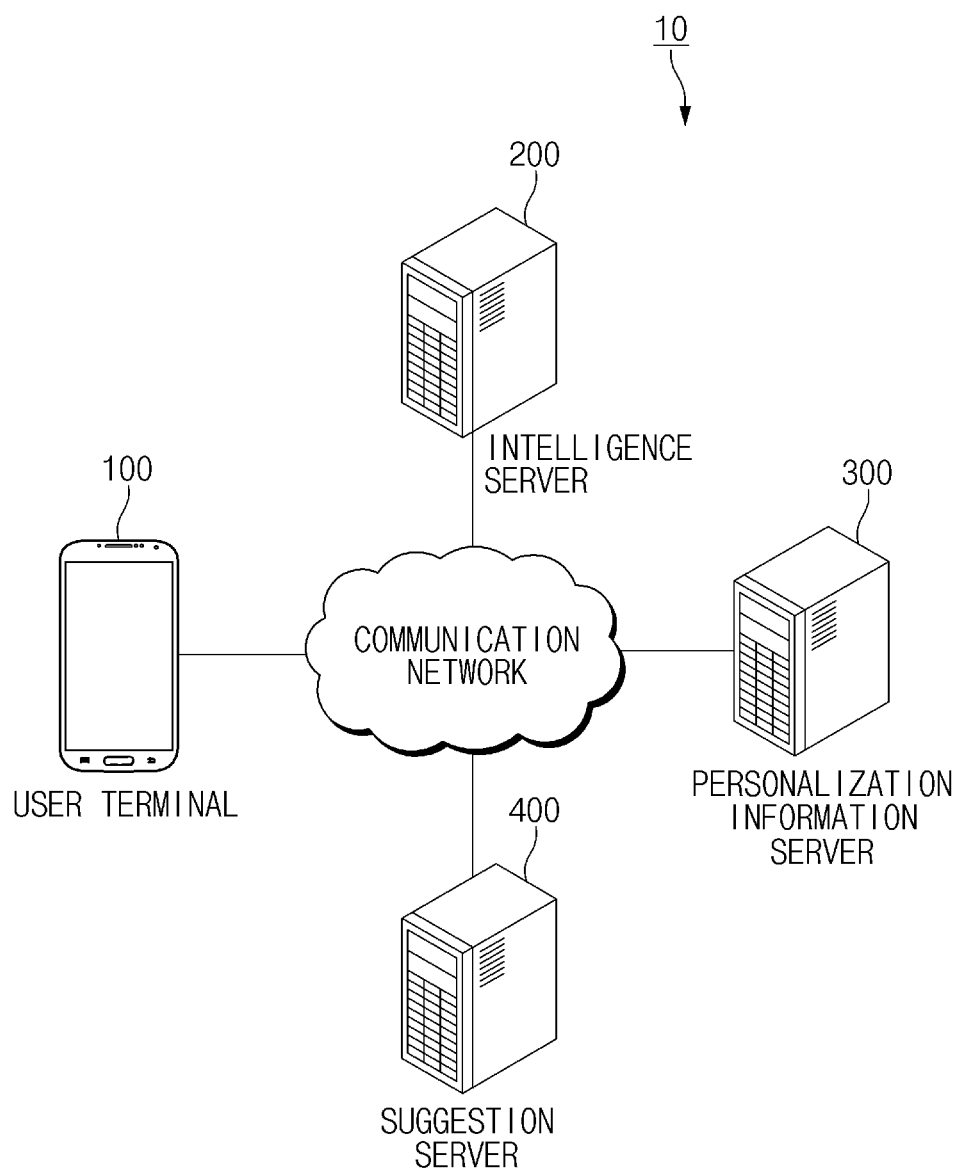
FIG. 1A is a diagram illustrating an integrated intelligence system, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In this specification, the expressions 'have', 'may have', 'include' and 'comprise', or 'may include' and 'may comprise' used herein indicate existence of corresponding features (e.g., elements such as numeric values, functions, operations, or components) but do not exclude presence of additional features.

In this specification, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, a first user device and a second user device indicate different user devices regardless of the order or priority. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even when terms are terms which are defined in the specification, they may not be interpreted to exclude embodiments of the disclosure.

According to various embodiments of the disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. According to an embodiment, an electronic device may be a flexible electronic device. Furthermore, according to an embodiment of the disclosure, an electronic device may not be limited to the above-described electronic devices and may include other electronic devices and new electronic devices according to the development of technologies.

Hereinafter, electronic devices according to various embodiments will be described with reference to the accompanying drawings. In this specification, the term "user" used herein may refer to a person who uses an electronic device or may refer to a device (e.g., an artificial intelligence electronic device) that uses an electronic device.

Prior to describing the disclosure, an integrated intelligence system to which various embodiments of the disclosure may be applied may be described with reference to FIGS. 1A, 1B, 1C, 1D, and 1E.

FIG. 1A is a diagram illustrating an integrated intelligence system, according to an embodiment.

Referring to FIG. 1A, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The other app may be executed through the intelligence app of the user terminal 100 and a user input for performing a task may be received. For example, the user input may be received through a physical button, a touch pad, a voice input, a remote input, or the like.

According to an embodiment, the user terminal 100 may receive a user utterance as a user input. The user terminal 100 may receive the user utterance and may generate a command for operating an app based on the user utterance. Accordingly, the user terminal 100 may operate the app, using the command.

The intelligence server 200 may receive a user voice input from the user terminal 100 over a communication network and may change the user voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may mean, but not limited to, the sequence of states, which allows the electronic device to perform the task requested by the user. In other words, the path rule may include information about the sequence of the states. For example, the task may be a certain action that the intelligence app is capable of providing. The task may include the generation of a schedule, the transmission of a picture to the desired counterpart, or the provision of weather information. The user terminal 100 may perform the task by sequentially having at least one or more states (e.g., an operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule among the plurality of predefined path rules or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, on a display. According to another embodiment, the user terminal 100 may execute the action and may not display the result obtained by executing the action on the display. For example, the user terminal 100 may execute a plurality of actions and may display only the partial result of the plurality of actions on the display. For example, the user terminal 100 may display only the result, which is obtained by executing the last action, on the display. According to another embodiment, the user terminal 100 may receive the input of a user to display the result of executing the action on the display.

The personalization information server 300 may include a database in which user information is stored. For example, the personalization information server 300 may receive the user information (e.g., context information, information about execution of an app, or the like) from the user terminal 100 and may store the user information in the database. The intelligence server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include the database storing information about the function in the user terminal 100, the introduction of an application, or the function to be provided. For example, the suggestion server 400 may include a database associated with a function that a user utilizes, by receiving the user information of the user terminal 100 from the personalization information server 300. The user terminal 100 may receive information about the function to be provided from the suggestion server 400 over the communication network and may provide the information to the user.

Figure 1B:
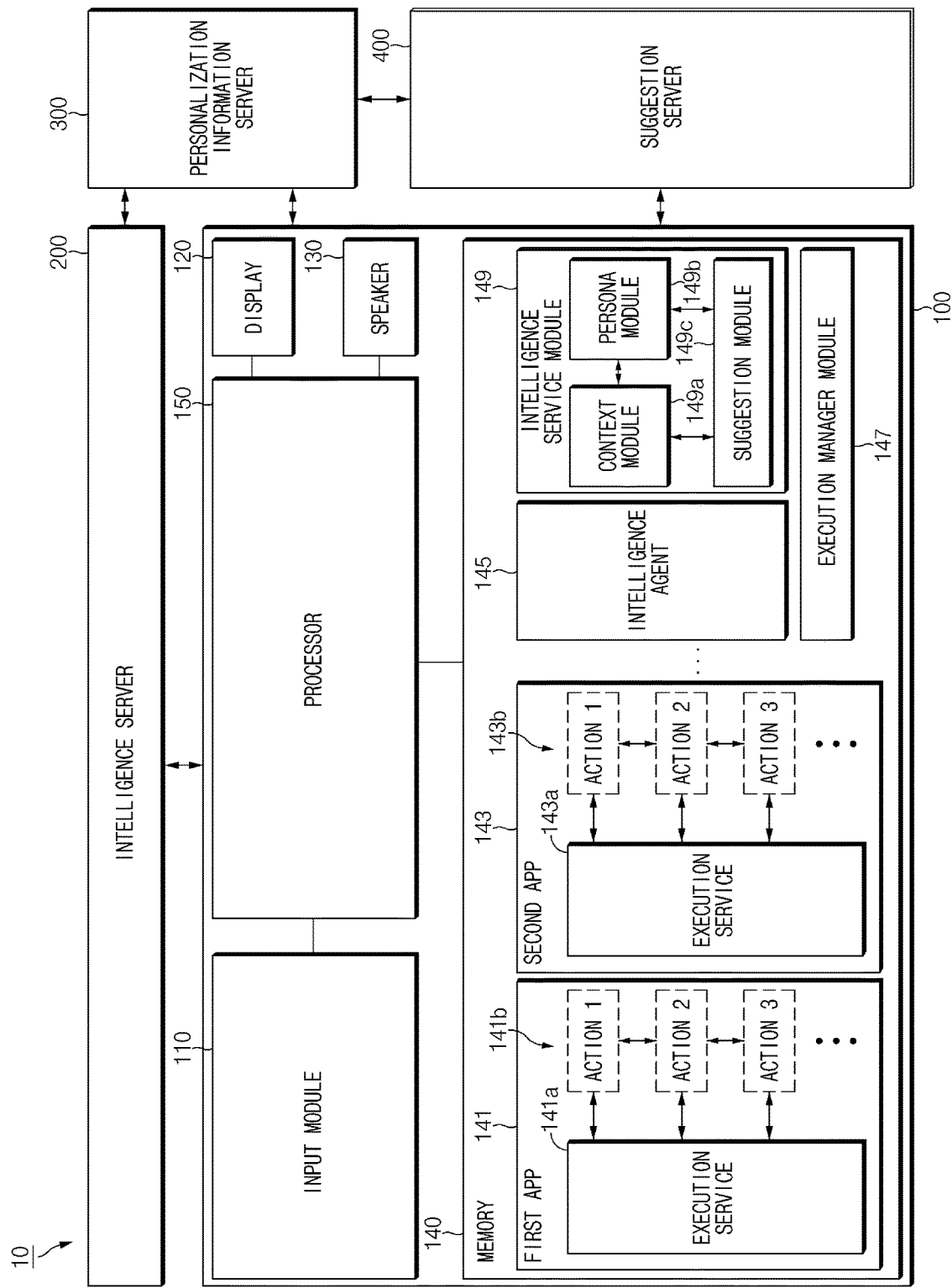
FIG. 1B is a diagram illustrating a user terminal of an integrated intelligence system, according to an embodiment.

FIG. 1B is a diagram illustrating a user terminal of an integrated intelligence system, according to an embodiment.

Referring to FIG. 1B, the user terminal 100 may include an input module 110, a display 120, a speaker 130, a memory 140, or a processor 150. At least part of components of the user terminal 100 (e.g., the input module 110, the display 120, the speaker 130, the memory 140, or the like) may be electrically or operatively connected to the processor 150. The user terminal 100 may further include housing, and components of the user terminal 100 may be seated inside the housing or may be positioned on the housing. The user terminal 100 may further include a communication circuit (or a communication interface) positioned inside the housing. The user terminal 100 may transmit or receive data (or signal) to or from an external server (e.g., the intelligence server 200) through the communication circuit. In various embodiments, the user terminal 100 may be referred to as an "electronic device" and may further include components of an electronic device 1001 to be described through FIG. 10.

According to an embodiment, the input module 110 may receive a user input from a user. For example, the input module 110 may receive the user input from the connected external device (e.g., a keyboard, a headset, or the like). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone capable of receiving the utterance of the user as a voice signal. For example, the input module 110 may include a speech input system and may receive the utterance of the user as a voice signal through the speech input system. For example, at least part of the microphone may be exposed through one region (e.g., a first region) of the housing. In an embodiment, the microphone may be controlled to operate when the microphone is controlled as being in an always-on state (e.g., always on) to receive an input (e.g., a voice input) according to a user utterance or may be controlled to operate when user manipulation provided to one region of the user terminal 100 is applied to a hardware key (e.g., 112 of FIG. 1C). The user manipulation may include press to the hardware key 112, press and hold to the hardware key 112, or the like.

According to an embodiment, the display 120 may display an image, a video, and/or an execution screen of an application. For example, the display 120 may display a graphic user interface (GUI) of an app. In an embodiment, at least part of the display 120 may be exposed through a region (e.g., a second region) of the housing to receive an input (e.g., a touch input or a drag input) by a user's body (e.g., a finger).

According to an embodiment, the speaker 130 may output a voice signal. For example, the speaker 130 may output the voice signal, which is generated inside the user terminal 100 or received from an external device (e.g., the intelligence server 200 of FIG. 1A). In an embodiment, at least part of the speaker 130 may be exposed through one region (e.g., a third region) of the housing in association with the output efficiency of the voice signal.

According to an embodiment, the memory 140 may store a plurality of apps (or application programs) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147, and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a to perform a function. In other words, the execution service modules 141a and 143a may be activated by the execution manager module 147 of the processor 150, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., when a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may deliver completion information to the execution manager module 147.

According to an embodiment, when the plurality of actions 141b and 143b are respectively executed in the apps 141 and 143, the plurality of actions 141b and 143b may be executed sequentially. When the execution of one action (e.g., action 1 of the first app 141 or action 1 of the second app 143) is completed, the execution service modules 141a and 143a may open the next action (e.g., action 2 of the first app 141 or action 2 of the second app 143) and may deliver the completion information to the execution manager module 147. Here, it may be understood that opening an arbitrary action is to transition a state of the arbitrary action to an executable state or to prepare the execution of an arbitrary action. In other words, when an arbitrary action is not opened, the corresponding action may not be executed. When the completion information is received, the execution manager module 147 may deliver the execution request associated with the next action (e.g., action 2 of the first app 141 or action 2 of the second app 143) to the execution service modules 141a and 143a. According to an embodiment, when the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may deliver the execution request of the first action (e.g., action 1 of the second app 143) of the second app 143 to the execution service module 143a.

According to an embodiment, when the plurality of actions 141b and 143b are executed in the apps 141 and 143, the result screen according to the execution of each of the executed plurality of actions 141b and 143b may be displayed on the display 120. According to an embodiment, only the part of a plurality of result screens according to the execution of the executed plurality of actions 141b and 143b may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and may read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit a user input received through the input module 110 to the intelligence server 200 and may process the user input through the intelligence server 200. According to an embodiment, before transmitting the user input to the intelligence server 200, the processor 150 may execute the intelligence agent 145 to preprocess the user input. This will be described later.

According to an embodiment, the intelligence agent 145 may execute a wake-up recognition module stored in the memory 140 to recognize the call of a user. As such, the processor 150 may recognize the wake-up command of a user through the wake-up recognition module and may execute the intelligence agent 145 for receiving a user input when receiving the wake-up command. The wake-up recognition module may be implemented with a low-power processor (e.g., a processor included in an audio codec). According to various embodiments, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for recognizing the user input. The processor 150 may recognize a user input for executing the operation of the app through the speech recognition module. According to various embodiments, the processor 150 may recognize a restricted user input (e.g., an utterance such as "click" for performing a capture operation when a camera app is being executed) through the speech recognition module. The processor 150 may assist the intelligence server 200 by recognizing and rapidly processing a user command capable of being processed in the user terminal 100, through the speech recognition module. According to an embodiment, the speech recognition module of the intelligence agent 145 for recognizing a user input may be implemented in an app processor.

According to an embodiment, the speech recognition module (or a wake-up recognition module stored in the memory 140) of the intelligence agent 145 may recognize the user utterance, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may deliver the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149*b*.

According to an embodiment, the processor 150 may execute the execution manager module 147, may receive the path rule from the intelligence agent 145, and may execute the apps 141 and 143; and the processor 150 may allow the apps 141 and 143 to execute the actions 141*b* and 143*b* included in the path rule. For example, the processor 150 may transmit command information (e.g., path rule information) for executing the actions 141*b* and 143*b* to the apps 141 and 143, through the execution manager module 147; and the processor 150 may receive completion information of the actions 141*b* and 143*b* from the apps 141 and 143.

According to an embodiment, the processor 150 may execute the execution manager module 147 to transmit the command information (e.g., path rule information) for executing the actions 141*b* and 143*b* of the apps 141 and 143 between the intelligence agent 145 and the apps 141 and 143. The processor 150 may bind the apps 141 and 143 to be executed depending on the path rule through the execution manager module 147 and may deliver the command information (e.g., path rule information) of the actions 141*b* and 143*b* included in the path rule to the apps 141 and 143. For example, the processor 150 may sequentially transmit the actions 141*b* and 143*b* included in the path rule to the apps 141 and 143, through the execution manager module 147 and may sequentially execute the actions 141*b* and 143*b* of the apps 141 and 143 depending on the path rule.

According to an embodiment, the processor 150 may execute the execution manager module 147 to manage execution states of the actions 141*b* and 143*b* of the apps 141 and 143. For example, the processor 150 may receive information about the execution states of the actions 141*b* and 143*b* from the apps 141 and 143, through the execution manager module 147. For example, when the execution states of the actions 141*b* and 143*b* are in partial landing (e.g., when a parameter necessary for the actions 141*b* and 143*b* are not input), the processor 150 may deliver information about the partial landing to the intelligence agent 145, through the execution manager module 147. The processor 150 may make a request for an input of necessary information (e.g., parameter information) to the user, using the received information through the intelligence agent 145. For another example, when the execution state of each of the actions 141b and 143b is an operating state, the processor 150 may receive an utterance from the user through the intelligence agent 145. The processor 150 may deliver information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may deliver the received parameter information to the execution manager module 147 through the intelligence agent 145. The execution manager module 147 may change a parameter of each of the actions 141b and 143b to a new parameter, using the received parameter information.

According to an embodiment, the processor 150 may execute the execution manager module 147 to transmit parameter information included in the path rule to the apps 141 and 143. When the plurality of apps 141 and 143 are sequentially executed depending on the path rule, the execution manager module 147 may deliver the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial action 141b but does not specify the other app 143 executing the remaining action 143b, the processor 150 may receive a plurality of different path rules, in which the same app 141 (e.g., a gallery app) executing the partial action 141b is executed and the different app 143 (e.g., a message app or Telegram app) executing the remaining action 143b is executed, through the execution manager module 147. For example, the processor 150 may execute the same actions 141b and 143b (e.g., the same successive actions 141b and 143b) of the plurality of path rules, through the execution manager module 147. When the processor 150 executes the same action, the processor 150 may display a state screen for selecting the different apps 141 and 143 respectively included in the plurality of path rules in the display 120, through the execution manager module 147.

According to an embodiment, the intelligence service module 149 may include a context module 149a, a persona module 149b, or a suggestion module 149c.

The context module 149a may collect current states of the apps 141 and 143 from the apps 141 and 143. For example, the context module 149a may receive context information indicating the current states of the apps 141 and 143 to collect the current states of the apps 141 and 143.

The persona module 149b may manage personal information of the user utilizing the user terminal 100. For example, the persona module 149b may collect the usage information and the execution result of the user terminal 100 to manage personal information of the user.

The suggestion module 149c may predict the intent of the user to recommend a command to the user. For example, the suggestion module 149c may recommend a command to the user in consideration of the current state (e.g., a time, a place, a situation, or an app) of the user.

Figure 1C:
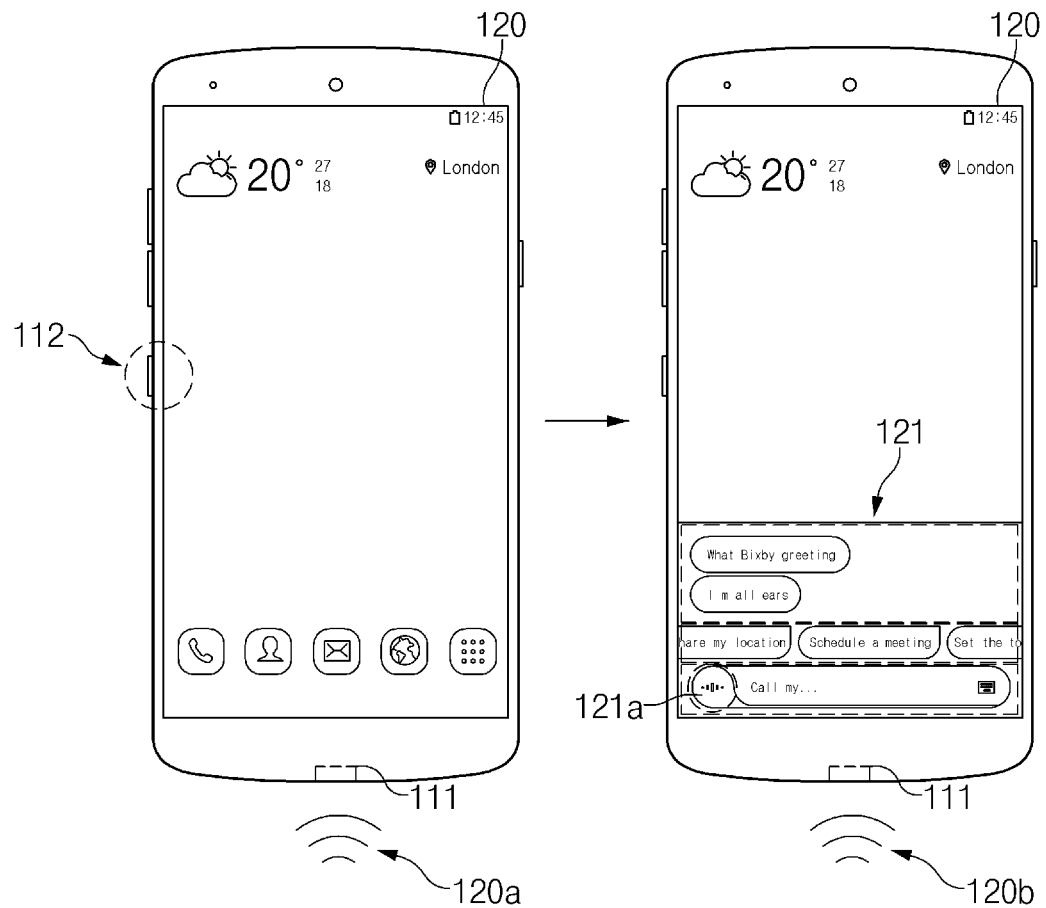
FIG. 1C is a diagram illustrating a form in which an intelligence app of a user terminal is executed, according to an embodiment.

FIG. 1C is a diagram illustrating a form in which an intelligence app of a user terminal is executed, according to an embodiment.

Referring to FIG. 1C, the user terminal 100 may include a hardware button 112 that functions as an interface for receiving an input according to a user utterance. For example, the hardware button 112 may be disposed in an accessible region of the user's body (e.g. a finger) on the housing of the user terminal 100; at least part of the hardware button 112 may be exposed to the outside of the housing. In an embodiment, the user terminal 100 may execute an intelligence app (e.g., a speech recognition app) operating in conjunction with the intelligence agent 145 of FIG. 1B, in response to the user manipulation applied to the hardware button 112. In an embodiment, a user may continuously press the hardware key 112 (e.g., press, press and hold, or the like) to enter (120a) a voice and then may enter (120a) the voice.

Alternatively, when receiving a user input through the hardware key 112, the user terminal 100 may display a UI 121 of the intelligence app on the display 120; the user may touch a speech recognition button 121a included in the UI 121 to enter (120b) a voice in a state where the UI 121 is displayed on the display 120.

Alternatively, the user terminal 100 may execute the installed intelligence app through a microphone 111. For example, when receiving a specified voice (e.g., wake up!, or the like) through the microphone 111, the user terminal 100 may example the intelligence app and may display the UI 121 of the intelligence app on the display 120.

Figure 1D:
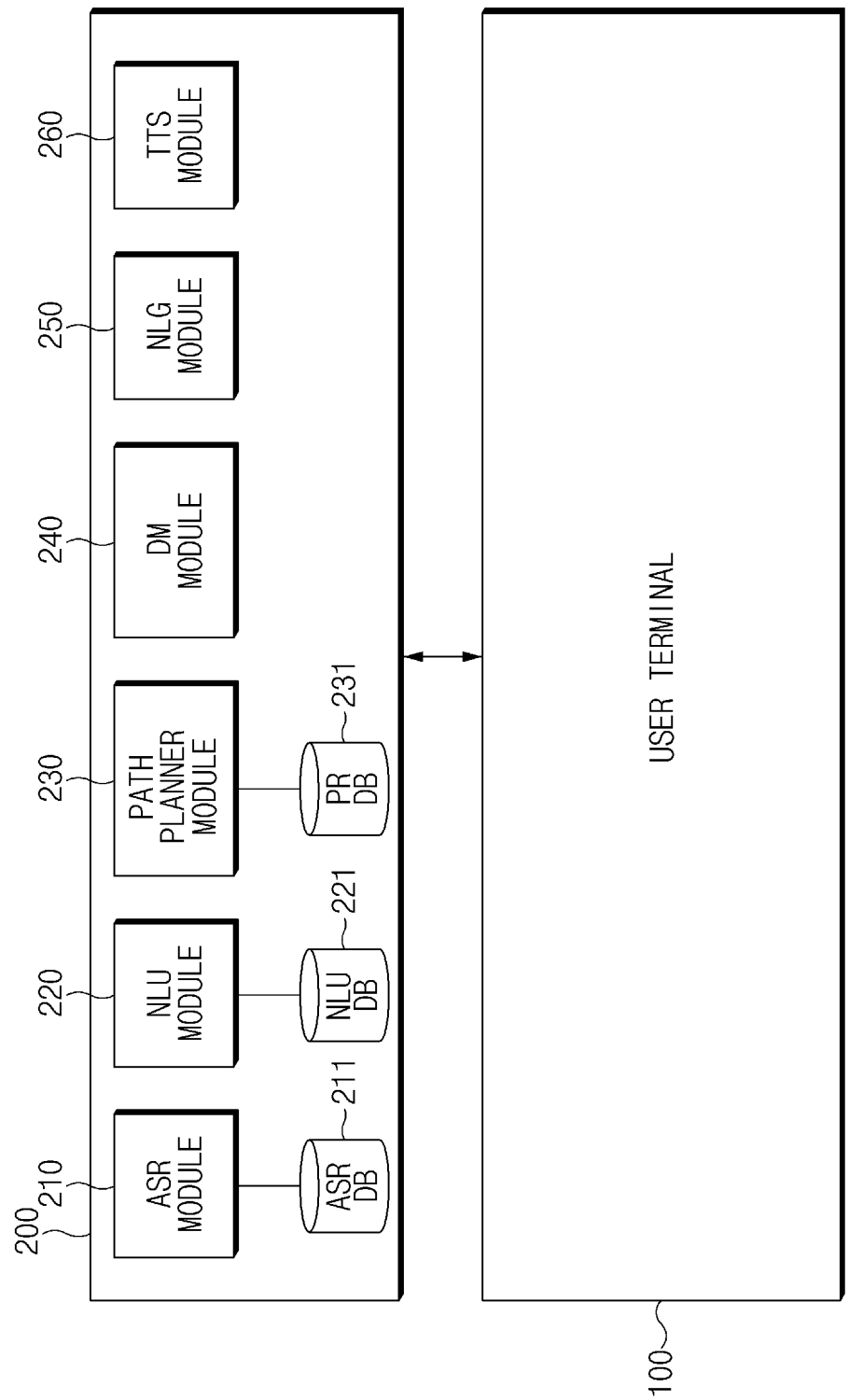
FIG. 1D is a diagram illustrating an intelligence server of an integrated intelligence system, according to an embodiment.

FIG. 1D is a diagram illustrating an intelligence server of an integrated intelligence system, according to an embodiment.

Referring to FIG. 1D, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. In various embodiments, at least part of the above-described components of the intelligence server 200 may be included in the user terminal 100 to perform a corresponding function operation.

According to an embodiment, the intelligence server 200 may include a communication circuit, a memory, or a processor. The processor may execute an instruction stored in the memory to operate the ASR module 210, the NLU module 220, the path planner module 230, the DM module 240, the NLG module 250, or the TTS module 260. The intelligence server 200 may transmit or receive data (or signal) to or from an external electronic device (e.g., the user terminal 100) through the communication circuit.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and may determine which syntactic elements the divided units have. The semantic analysis may be performed by using semantic matching, rule matching, formula matching, or the like. Accordingly, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, to determine the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter to generate one path rule or a plurality of path rules. For example, the NLU module 220 may arrange the app to be executed and the action to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user's intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. The information changed to the text form may be in the form of a natural language speech. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information in the text form to information of a voice form. The TTS module 260 may receive the information of the text form from the NLG module 250, may change the information of the text form to the information of a voice form, and may transmit the information of the voice form to the user terminal 100. The user terminal 100 may output the information in the voice form to the speaker 130.

According to an embodiment, the NLU module 220, the path planner module 230, and the DM module 240 may be implemented with one module. For example, the NLU module 220, the path planner module 230, and the DM module 240 may be implemented with one module, may determine the user intent and the parameter, and may generate a response (e.g., a path rule) corresponding to the determined user intent and parameter. As such, the generated response may be transmitted to the user terminal 100.

Figure 1E:
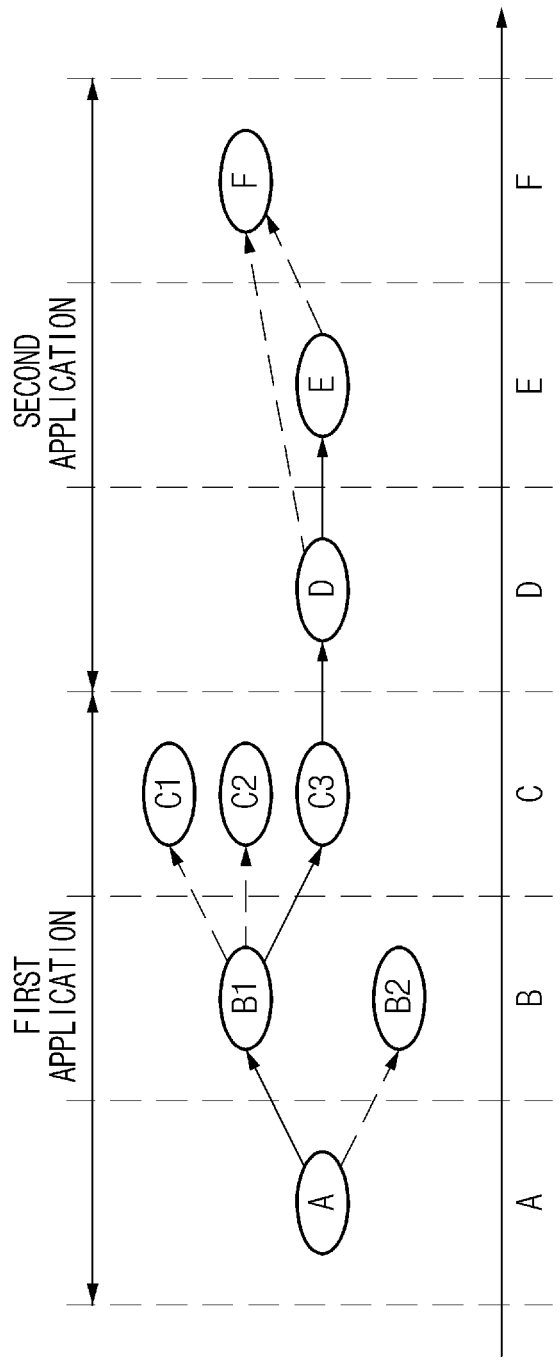
FIG. 1E is a diagram illustrating a path rule generating form of an intelligence server, according to an embodiment.

FIG. 1E is a diagram illustrating a path rule generating form of an intelligence server, according to an embodiment.

Referring to FIG. 1E, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules, each of which includes a plurality of actions (e.g., a sequence of states). The action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 to transmit the selected one path rule to the user terminal 100.

According to another embodiment, the NLU module 220 may determine the intent of a user and the parameter corresponding to the user input (e.g., an input for selecting C3) additionally entered by the user terminal 100 to transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may deliver the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user, using the information about the insufficient parameter, through the intelligence agent 145. When the additional input is received by the user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, when a user input, in which a part of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is partly missing, by using the user information. As such, even though the user input in which a portion of information is missing is received by the intelligence server 200, the NLU module 220 may make a request for the missing information to receive an additional input or may determine a path rule corresponding to the user input by using user information.

According to an embodiment, Table 1 attached below may indicate an exemplary form of a path rule associated with a task that a user requests.

TABLE 1

| Path rule ID | State | Parameter |
| --- | --- | --- |
| Gallery_101 | PictureView(25) | NULL |
|  | SearchView(26) | NULL |
|  | SearchViewResult(27) | Location, time |
|  | SearchEmptySelectedView(28) | NULL |
|  | SearchSelectedView(29) | ContentType, selectall |
|  | CrossShare(30) | anaphora |

Referring to Table 1, a path rule that is generated or selected by an intelligence server (the intelligence server 200 of FIG. 1D) depending on a user utterance (e.g., "please share a picture") may include at least one state 25, 26, 27, 28, 29 or 30. For example, the at least one state (e.g., one operating state of the user terminal 100) may correspond to at least one of picture application execution (PicturesView) 25, picture search function execution (SearchView) 26, search result display screen output (SearchViewResult) 27, search result display screen output, in which a picture is non-selected, (SearchEmptySelectedView) 28, search result display screen output, in which at least one picture is selected, (SearchSelectedView) 29, or share application selection screen output (CrossShare) 30. In an embodiment, parameter information of the path rule may correspond to at least one state. For example, at least one picture is included in the selected state of SearchSelectedView 29.

The task (e.g., "share a picture!") that the user requests may be performed depending on the execution result of the path rule including the sequence of the states 25, 26, 27, 28, and 29.

Figure 2:
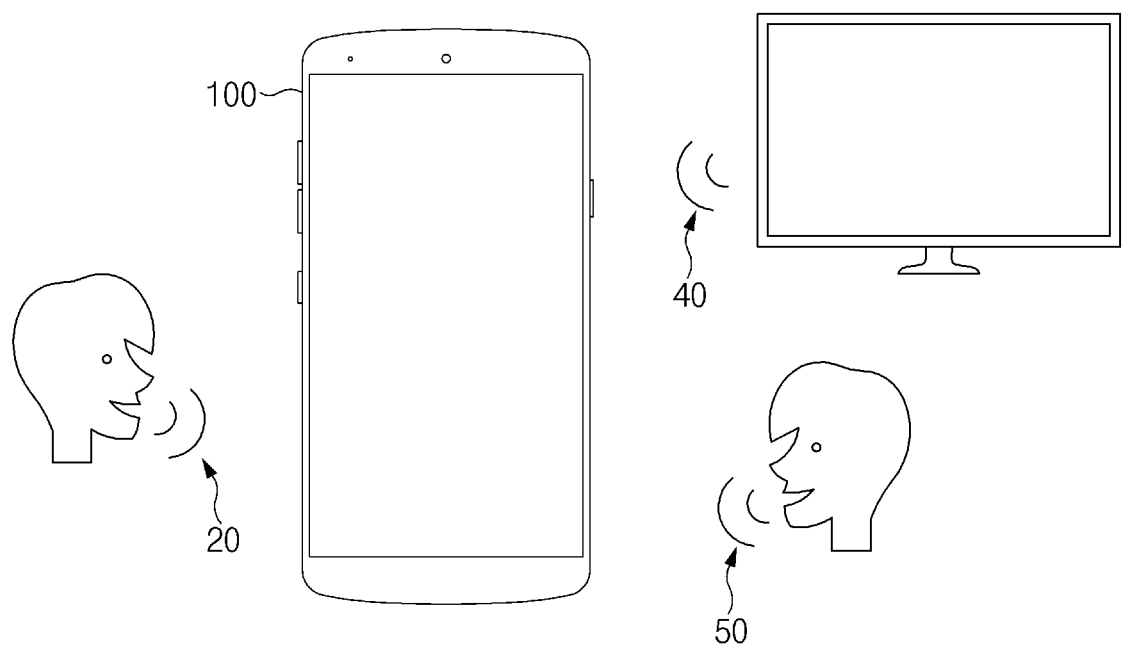
FIG. 2 is a diagram illustrating an operating environment of a user terminal according to an embodiment.

FIG. 2 is a diagram illustrating an operating environment of a user terminal according to an embodiment.

As described above through FIG. 1A to 1E, the integrated intelligence system 10 of FIG. 1A may perform a series of processes for providing a speech recognition-based service. For example, the user terminal 100 may receive a user utterance including a specific command or intent for performing a task and may transmit voice data according to the user utterance to the intelligence server 200 of FIG. 1D. The intelligence server 200 may derive the intent of the user utterance associated with the voice data based on a matching rule composed of a domain, intent, and a parameter, in response to receiving the voice data. The intelligence server 200 may select an application program for performing a task in the user terminal 100 based on the derived intent of the user utterance, and may generate or select a path rule for states (or actions) of the user terminal 100 accompanying the execution of the task to provide the path rule to the user terminal 100.

Referring to FIG. 2, upon performing a series of processes as described above, the noise operating as an impeding factor upon performing the functional operation of the user terminal 100 may be present in the operating environment of the user terminal 100. For example, data of sound 40 output from sound media (e.g., TV, radios or speaker devices, or the like) adjacent to the user terminal 100 or voice data by an utterance 50 of other people may be mixed with voice data according to a user utterance 20 on the user terminal 100. As such, when noise data (e.g., sound data by sound media and/or voice data by utterances of other people) according to at least one noise is entered into the user terminal 100 in addition to the voice data of the user utterance 20 including a specific command or intent, the recognition or preprocessing efficiency of the user terminal 100 for the voice data of the user utterance 20 may be reduced.

In this regard, the user terminal 100 according to an embodiment may generate a speaker recognition model for a specified user (or a speaker) and may recognize the user utterance 20 performed by the specified user, based on the speaker recognition model. For example, the user terminal 100 may detect voice data corresponding to the speaker recognition model among pieces of mixed data (e.g., voice data according to the user utterance 20 and noise data according to noise) and may preprocess (e.g., end-point detection, or the like) the detected voice data to transmit the preprocessed voice data to the intelligence server 200. Hereinafter, various embodiments associated with voice detection (or voice data detection) based on the identification of a specified user (or a speaker) and functional operations of components implementing the same may be described.

Figure 3A:
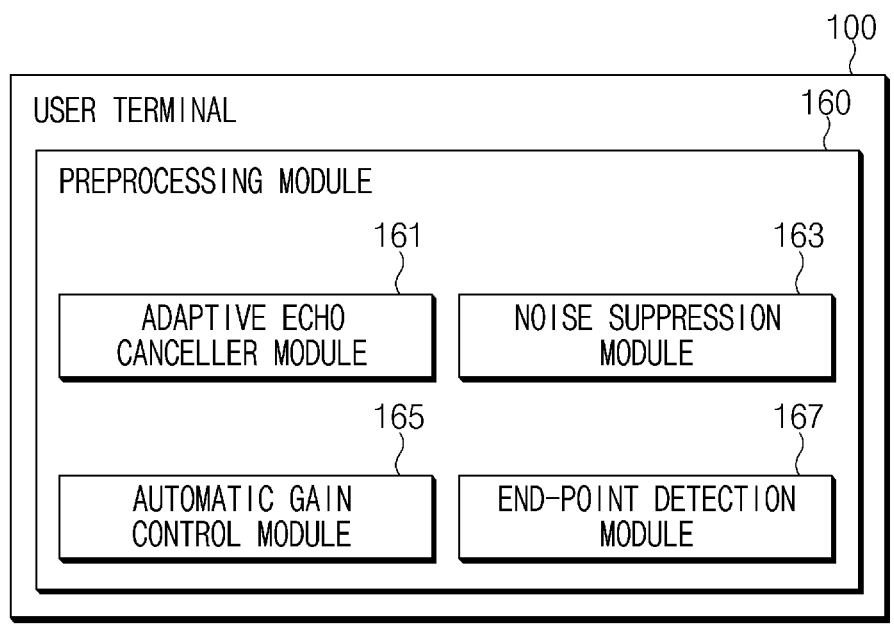
FIG. 3A is a diagram illustrating a preprocessing module of a user terminal according to an embodiment.
Figure 3B:
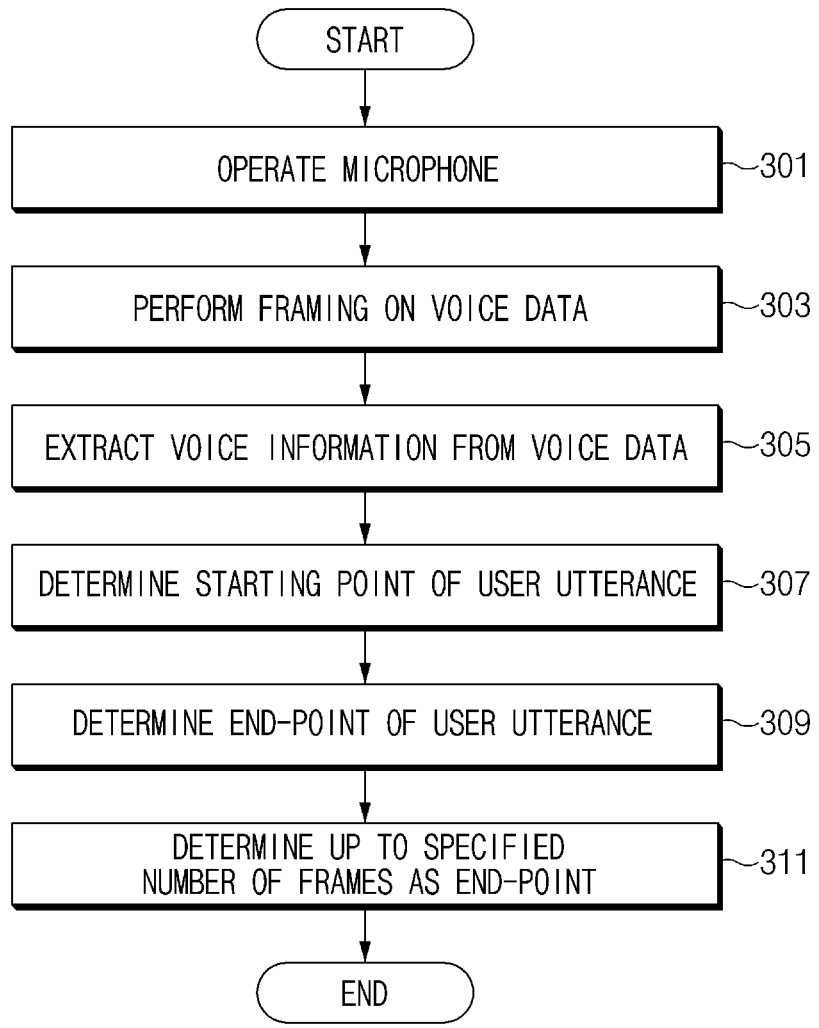
FIG. 3B is a diagram illustrating an end-point detection method of a user terminal according to an embodiment.
Figure 3C:
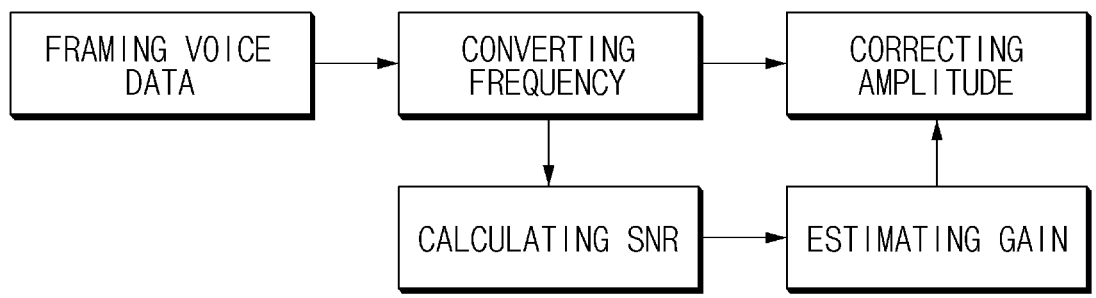
FIG. 3C is a diagram illustrating an operation example of a noise suppression module according to an embodiment.

FIG. 3A is a diagram illustrating a preprocessing module of a user terminal according to an embodiment. FIG. 3B is a diagram illustrating an end-point detection method of a user terminal according to an embodiment. FIG. 3C is a diagram illustrating an operation example of a noise suppression module according to an embodiment.

Referring to FIG. 3A, the user terminal 100 may preprocess voice data of a user utterance entered through a microphone (e.g., 111 in FIG. 1C) for reliable speech recognition. In this regard, the user terminal 100 may include a preprocessing module 160 including at least one of an adaptive echo canceller module 161, a noise suppression module 163, an automatic gain control module 165, or an end-point detection module 167.

The adaptive echo canceller module 161 may cancel the echo included in voice data according to a user utterance. The noise suppression module 163 may suppress background noise by filtering the voice data. The automatic gain control module 165 may perform volume adjustment by applying a gain value to the user utterance or may perform equalizing changing frequency features.

Referring to FIGS. 3A and 3B, the end-point detection module 167 may detect the end-point of a user utterance, and may determine the section of voice data based on the detected end-point. Referring to an operation in which the end-point detection module 167 preprocesses the user utterance, when the user utterance is received depending on operating (or activating) the microphone 111 in operation 301, the end-point detection module 167 may perform framing on the voice data of the received user utterance at a specified interval or period in operation 303. In operation 305, the end-point detection module 167 may extract voice information from each voice data corresponding to at least one frame. In various embodiments, the voice information may include an entropy value based on the time axis feature or frequency feature of the voice data, or may be a probability value. Alternatively, the voice information may include a signal-to-noise ratio (SNR) value that is a ratio of the intensity (or magnitude) of the input voice signal (or voice data) to the intensity (or magnitude) of the noise signal (or noise data).

In operation 307 and operation 309, the end-point detection module 167 may determine the starting point and end-point of an user utterance by comparing at least a piece of voice information extracted from each voice data corresponding to at least one frame with a specified threshold value. In this regard, the end-point detection module 167 may determine data including voice information of the threshold value or more as voice data and may determine at least one frame including voice information of the threshold value or more as a voice data section. The end-point detection module 167 may determine that the first frame in the determined voice data section is the starting point of the user utterance, and may determine that the final frame in the voice data section is the end-point of the user utterance.

According to various embodiments, in operation 311, the end-point detection module 167 may further determine the end-point of the user utterance based on the specified number of frames. In this regard, the end-point detection module 167 may determine whether the final frame in the voice data section corresponds to a count less than the specified number of frames from the first frame. In an embodiment, when the final frame corresponds to the count less than the specified number of frames, the end-point detection module 167 may regard up to the specified number of frames as a voice data section, and then may further determine whether voice information of a threshold value or more for the frame after the final frame is included.

In various embodiments, the end-point detection module 167 may complexly perform operation 307, operation 309, and operation 311. For example, the end-point detection module 167 may determine that the first frame including voice information of the threshold value or more is the starting point of an user utterance, may regard frames from the first frame to the specified number of frames as a voice data section, and may determine that the final frame including voice information of the threshold value or more in the voice data section is the end-point of the user utterance.

Referring to FIGS. 3A and 3C, in another embodiment, the end-point detection module 167 may predict a voice data section according to a user utterance from the functional operation of the noise suppression module 163. In this regard, the noise suppression module 163 may perform framing on the received voice data of the user utterance and may convert the frequency of the voice data corresponding to at least one frame. The noise suppression module 163 may correct the amplitude by estimating the gain for the voice data of which the frequency is converted, and may calculate the SNR (e.g., a ratio of the intensity (or magnitude) of the voice signal (or voice data) to the intensity (or magnitude) of the noise signal (or noise data) for the voice data of which the frequency is converted, to estimate the gain. The end-point detection module 167 predicts a voice data section according to a user utterance based on the SNR value calculated by the noise suppression module 163, may determine the first frame of the predicted voice data section as the starting point of the user utterance, and may determine the final frame as the end-point of the user utterance. Alternatively, the noise suppression module 163 may determine the starting point and end-point of the user utterance based on the calculated SNR and may deliver the determination information to the end-point detection module 167. According to various embodiments, after the amplitude of the above-described voice data is corrected, the noise suppression module 163 may inversely convert the converted frequency or may further perform an overlap-add operation on the voice data.

Figure 4A:
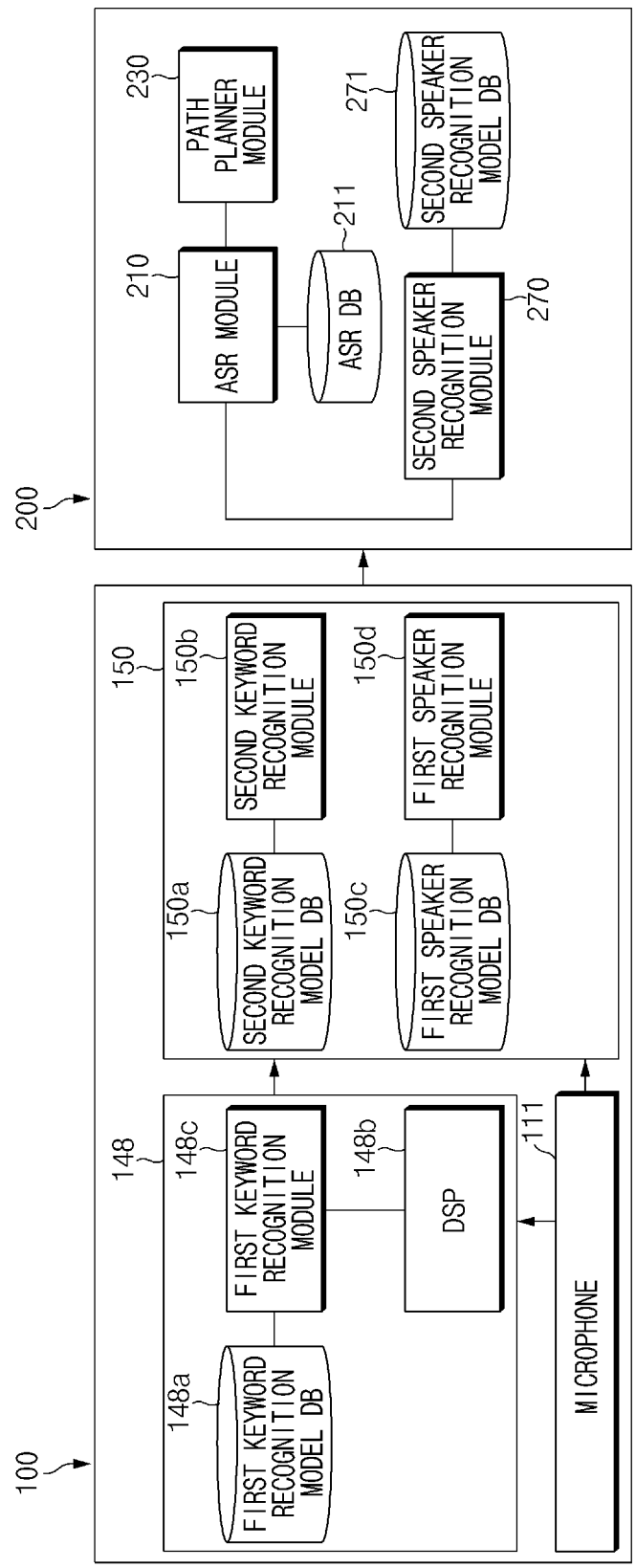
FIG. 4A is a diagram illustrating a wake-up command utterance recognition form of a user terminal according to an embodiment.
Figure 4B:
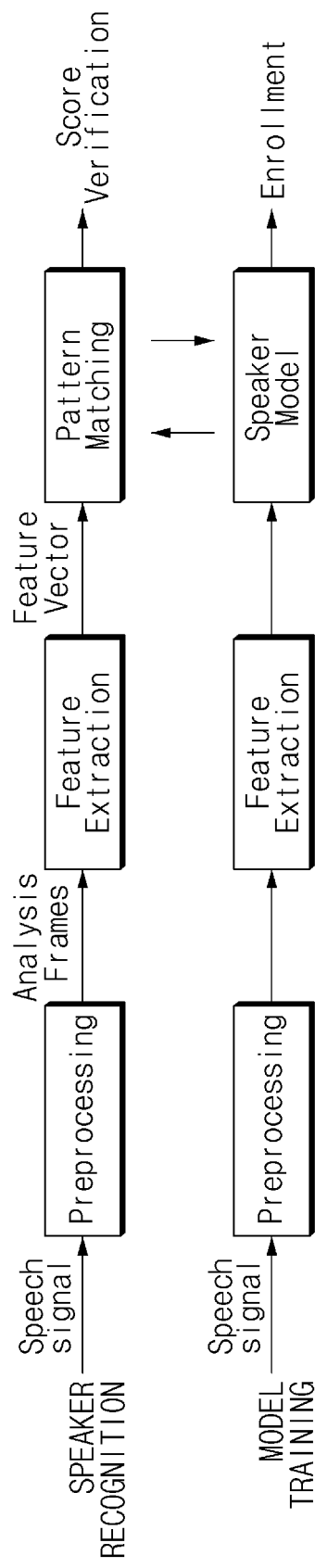
FIG. 4B is a diagram illustrating a training form for a keyword recognition model and a speaker recognition model of a user terminal according to an embodiment.
Figure 5:
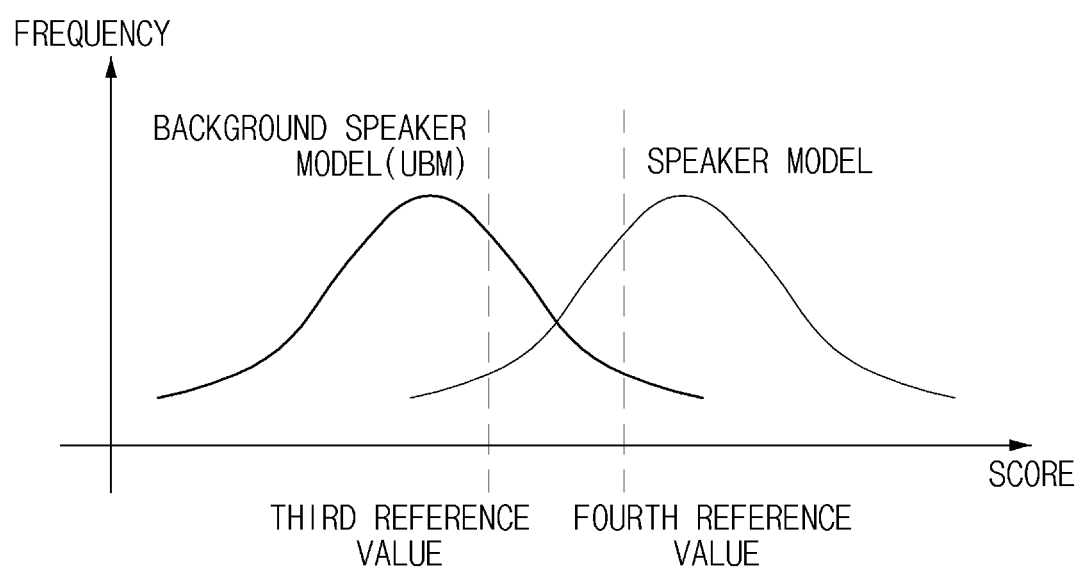
FIG. 5 is a diagram illustrating a reference value-based speaker recognition form of a user terminal according to an embodiment.

FIG. 4A is a diagram illustrating a wake-up command utterance recognition form of a user terminal according to an embodiment. FIG. 4B is a diagram illustrating a training form for a keyword recognition model and a speaker recognition model of a user terminal according to an embodiment. FIG. 5 is a diagram illustrating a reference value-based speaker recognition form of a user terminal according to an embodiment.

Referring to FIG. 4A, the user terminal 100 may process a user's wake-up command utterance for changing the state of the user terminal 100, based on a wake-up recognition module 148 included in the memory (e.g., 140 in FIG. 1B) or the processor 150 of the user terminal 100. Alternatively, the user terminal 100 may process the wake-up command utterance through interaction with the intelligence server 200. In an embodiment, changing the state of the user terminal 100 may refer to the transition from a listening state for waiting for the reception of a user utterance to a wake-up state capable of recognizing or processing voice data entered depending on receiving the user utterance.

With regard to the processing of the wake-up command utterance, the wake-up recognition module 148 may include at least one of a first keyword recognition model DB 148a, a digital signal processor (DSP) 148b, or a first keyword recognition module 148c. The first keyword recognition model DB 148a may include a keyword recognition model referenced to determine whether at least one word included in the wake-up command utterance is a specified word (hereinafter referred to as a "wake-up command word") in association with the transition to the wake-up state.

In an embodiment, the DSP 148b may obtain voice data according to wake-up command utterance received through the microphone 111 to deliver the voice data to the first keyword recognition module 148c. The first keyword recognition module 148c may determine whether a wake-up command word is included in the received voice data. In this regard, the first keyword recognition module 148c may calculate a first score $SCORE_{KW1}$ for voice data received from the DSP 148b, with reference to the keyword recognition model included in the first keyword recognition model DB 148a.

$$SCORE_{KW1} == P(X|\lambda_{KW1})$$

Success if $SCORE_{KW1} > Th_{KW1}$ [Equation 1]

Equation 1 may refer to an equation referenced to determine whether a specified wake-up command word is included in the voice data according to the wake-up command utterance.

In an embodiment, the first keyword recognition module 148c may calculate a first score $SCORE_{KW1}$ by substituting the voice data received from the DSP 148b into a keyword recognition model $\lambda_{KW1}$. For example, the calculated first score $SCORE_{KW1}$ may function as an index indicating a mapping degree (or a confidence level) between the voice data and the keyword recognition model $\lambda_{KW1}$. When the calculated first score $SCORE_{KW1}$ is not less than a specified first reference value $Th_{KW1}$, the first keyword recognition module 148*c* may determine that at least one specified wake-up command word is included in the voice data according to the wake-up command utterance.

In an embodiment, with regard to the processing of the wake-up command utterance, the processor 150 may include at least one of a second keyword recognition model DB 150*a*, a second keyword recognition module 150*b*, a first speaker recognition model DB 150*c*, or a first speaker recognition module 150*d*. Similarly to the first keyword recognition model DB 148*a* of the above-described wake-up recognition module 148, the second keyword recognition model DB 150*a* may include a keyword recognition model referenced to determine whether the wake-up command utterance includes at least one specified wake-up command word. In an embodiment, the keyword recognition model included in the second keyword recognition model DB 150*a* may be at least partially different from the keyword recognition model included in the first keyword recognition model DB 148*a*.

In an embodiment, the processor 150 may obtain voice data according to the wake-up command utterance received through the microphone 111 to deliver the voice data to the second keyword recognition module 150*b*. The second keyword recognition module 150*b* may determine whether the specified at least one wake-up command word is included in the received voice data. In this regard, the second keyword recognition module 150*b* may calculate a second score $SCORE_{KW2}$ for voice data received from the processor 150, with reference to the keyword recognition model included in the second keyword recognition model DB 150*a*.

$$SCORE_{KW2}=P(X|\lambda_{KW2})$$

Success if $SCORE_{KW2} > Th_{KW2}$ [Equation 2]

Equation 2 may refer to an equation referenced to determine whether a specified wake-up command word is included in the voice data according to the wake-up command utterance.

In an embodiment, the second keyword recognition module 150*b* may calculate the second score $SCORE_{KW2}$ by substituting the voice data received from the processor 150 into the keyword recognition model $\lambda_{KW2}$ included in the second keyword recognition model DB 150*a*. Similarly to the first score $SCORE_{KW1}$ referenced by the wake-up recognition module 148, the calculated second score $SCORE_{KW2}$ may function as an index indicating the mapping degree (or a confidence level) between the voice data and the keyword recognition model $\lambda_{KW2}$. When the calculated second score $SCORE_{KW2}$ is not less than the specified second reference value $Th_{KW2}$, the second keyword recognition module 150*b* may determine that at least one specified wake-up command word is included in the voice data according to the wake-up command utterance.

According to various embodiments, score calculation methods performed by the first keyword recognition module 148*c* of the above-described wake-up recognition module 148 and the second keyword recognition module 150*b* of the processor 150 may be different from one another. For example, the first keyword recognition module 148*c* and the second keyword recognition module 150*b* may use algorithms (e.g., algorithms using feature vectors of different dimension numbers, or the like) of different configurations to calculate the score. For example, when one of the first keyword recognition module 148*c* or the second keyword recognition module 150*b* uses one of a Gaussian Mixture Model (GMM) algorithm or a Hidden Markov Model (HMM) algorithm, and the other thereof uses the other of the GMM algorithm or the HMM algorithm, the numbers of phoneme units used in the algorithms or sound models corresponding to the phoneme units may be different from one another. Alternatively, the first keyword recognition module 148*c* and the second keyword recognition module 150*b* may use the same algorithm to calculate the score, and may operate the same algorithm in different manners. For example, the first keyword recognition module 148*c* and the second keyword recognition module 150*b* may set and use search ranges for recognizing the wake-up command word for the same algorithm to be different from one another.

According to various embodiments, the recognition rate of the second keyword recognition module 150*b* for at least one specified wake-up command word may be higher than the recognition rate of the first keyword recognition module 148*c*. For example, the second keyword recognition module 150*b* may implement a high recognition rate for at least one specified wake-up command word, using a more complex algorithm (e.g., a viterbi decoding-based algorithm, or the like) than the first keyword recognition module 148*c*.

In an embodiment, the first speaker recognition model DB 150*c* may include a speaker recognition model referenced to determine whether the received wake-up command uttered by a specified speaker (e.g., the actual user of the user terminal 100). The speaker recognition model will be described later with reference to FIG. 6 below.

In an embodiment, the first speaker recognition module 150*d* may receive voice data according to the wake-up command utterance framed by the end-point detection module (e.g., 167 of FIG. 3A), from the DSP 148*b* in the wake-up recognition module 148 or from the processor 150 in the user terminal 100 and may determine whether the voice data corresponds to a specified speaker (e.g., the actual user of the user terminal 100). In this regard, the first speaker recognition module 150*d* may calculate a third score $SCORE_{SPK1}$ for the voice data received from the DSP 148*b* or the processor 150, with reference to the speaker recognition model included in the first speaker recognition model DB 150*c*.

$$SCORE_{SPK1} = \log\left(\frac{P(X \mid \lambda_{SPK1})}{P(X \mid \lambda_{UBM})}\right) \quad [\text{Equation 3}]$$

$$\begin{cases} \text{Fail} & \text{if } SCORE_{SPK1} < Th_{SPK1} \\ \text{Server decision} & \text{if } Th_{SPK1} \leq SCORE_{SPK1} < Th_{SPK2} \\ \text{Success} & \text{if } Th_{SPK2} \leq SCORE_{SPK1} \end{cases}$$

Equation 3 may refer to an equation referenced to determine whether the voice data according to a wake-up command utterance corresponds to at least one specified speaker (e.g., the actual user of the user terminal 100), and may be established based on, for example, a Universal Background Model-Gaussian Mixture Model (UBM-GMM) algorithm, or the like.

In an embodiment, the first speaker recognition module 150*d* may calculate the third score $SCORE_{SPK1}$ by substituting the voice data received from the DSP 148*b* or the processor 150 into the speaker recognition model $\lambda_{SPK1}$ and the background speaker model $\lambda_{UBM}$. For example, the background speaker model $\lambda_{UBM}$ may include the statistical model for at least one utterance performed by other people other than the specified speaker (e.g., the actual user of the user terminal 100).

Referring to FIGS. 4A and 4B, the user terminal 100 may train the above-described keyword recognition model $\lambda_{KW1}$ or $\lambda_{KW2}$ and the speaker recognition model $\lambda_{SPK1}$. For example, the user terminal 100 may train the keyword recognition model $\lambda_{KW1}$ or $\lambda_{KW2}$ and the speaker recognition model $\lambda_{SPK1}$, using the statistical feature of feature vectors extracted from the voice sample of the preprocessed wake-up command word. For example, the statistical feature may mean the distribution of difference values between the feature vector extracted from voice samples of the wake-up command word and feature vectors extracted from voice samples of the wake-up command word uttered by the specified speaker multiple times. The user terminal may train a recognition model by refining the recognition model stored in the database 148a, 150a or 150c, using the statistical feature.

Referring to Equation 3 and FIG. 5, the first speaker recognition module 150d may determine whether the voice data according to a wake-up command utterance corresponds to a specified speaker (e.g., the actual user of the user terminal 100), by comparing the calculated third score $SCORE_{SPK1}$ with a specified third reference value $Th_{SPK1}$ and/or a fourth reference value $Th_{SPK2}$. For example, when the calculated third score $SCORE_{SPK1}$ is less than the third reference value $Th_{SPK1}$, the first speaker recognition module 150d may determine that the voice data does not correspond to the specified speaker (e.g., the actual user of the user terminal 100). Alternatively, when the calculated third score $SCORE_{SPK1}$ is more than the fourth reference value $Th_{SPK2}$, the first speaker recognition module 150d may determine that the voice data received from the processor 150 is obtained depending on the wake-up command utterance of the specified speaker (e.g., the actual user of the user terminal 100). The third reference value $Th_{SPK1}$ or the fourth reference value $Th_{SPK2}$ may be set by the user, and may be changed depending on whether noise in the operating environment of the user terminal 100 is present.

In an embodiment, when the third score $SCORE_{SPK1}$ is not less than the third reference value $Th_{SPK1}$ and is less than the fourth reference value $Th_{SPK2}$, the first speaker recognition module 150d may determine whether the voice data corresponds to the specified speaker (e.g., the actual user of the user terminal 100), with reference to the functional operation of the intelligence server 200. In this regard, the processor 150 of the user terminal 100 may transmit the voice data according to the received wake-up command utterance to the intelligence server 200 and may receive recognition information about the voice data from the intelligence server 200. The first speaker recognition module 150d may determine whether the voice data corresponds to the specified speaker (e.g., the actual user of the user terminal 100), based on the received recognition information. To this end, in addition to the above-described components (e.g., the ASR module 210, the ASR DB 211, the path planner module 230, or the like), the intelligence server 200 may further include at least one of a second speaker recognition module 270 or a second speaker recognition model DB 271. Alternatively, to preprocess the voice data received from the processor 150 of the user terminal 100, the intelligence server 200 may further include a preprocessing module of the same or similar configuration as the preprocessing module 160 in FIG. 3 of the above-described user terminal 100.

The ASR module 210 may convert the voice data according to the wake-up command utterance received from the processor 150 into text data. For example, the ASR module 210 may convert the voice data received from the processor 150 into the text data, using pieces of information associated with sound models, language models, or large vocabulary speech recognition included in the ASR DB 211. In an embodiment, the ASR module 210 may provide the converted text data to the user terminal 100 and/or the path planner module 230. For example, when the converted text data includes only the at least one wake-up command word included in the ASR DB 211, the ASR module 210 may transmit the converted text data to only the user terminal 100. At this time, the processor 150 of the user terminal 100 may determine whether the voice data corresponding to the text data includes a specified wake-up command word, by analyzing the text data received from the ASR module 210 based on the above-described second keyword recognition module 150b. When not only the wake-up command word but also a word indicating a specific command or intent associated with a task is included in the converted text data, the ASR module 210 may provide the converted text data to both the user terminal 100 and the path planner module 230. The path planner module 230 may generate or select a path rule based on the text data received from the ASR module 210 and may transmit the generated or selected path rule to the user terminal 100.

The second speaker recognition model DB 271 may include a speaker recognition model referenced to determine whether the voice data according to the wake-up command utterance received from the processor 150 of the user terminal 100 is generated by the specified speaker (e.g., the actual user of the user terminal 100). In an embodiment, the second speaker recognition model DB 271 may include a plurality of speaker recognition models respectively corresponding to a plurality of speakers. It may be understood that the plurality of speakers include a user operating at least another user terminal as well as an actual user operating the user terminal 100. In an embodiment, the identification information (e.g., a name, information about an operating user terminal, or the like) of each of the plurality of speakers may be included in (e.g., mapped into) a speaker recognition model corresponding to the corresponding speaker.

The second speaker recognition module 270 may determine whether the voice data according to the wake-up command utterance received from the processor 150 of the user terminal 100 corresponds to the actual user of the user terminal 100, with reference to the plurality of speaker recognition models included in the second speaker recognition model DB 271. In this regard, the second speaker recognition module 270 may receive identification information about the actual user of the user terminal 100 together with the voice data from the processor 150. The second speaker recognition module 270 may select a speaker recognition model corresponding to the received identification information of the actual user among the plurality of speaker recognition models and may determine whether the selected speaker recognition model corresponds to the voice data received from the processor 150. The second speaker recognition module 270 may transmit recognition information corresponding to the determination result to the processor 150 of the user terminal 100; the first speaker recognition module 150d may determine whether the input voice data is generated depending on the wake-up command utterance of the specified speaker (e.g., the actual user of the user terminal 100), based on the recognition information.

As described above, the processor 150 of the user terminal 100 may determine whether at least one specified wake-up command word is included in the voice data according to the received wake-up command utterance, or may determine whether the voice data corresponds to the specified speaker (e.g., the actual user of the user terminal 100), based on the functional operation of the wake-up recognition module 148, the processor 150, or the intelligence server 200. When it is determined that at least one specified wake-up command word is included in the voice data and the voice data corresponds to the specified speaker (e.g., the actual user of the user terminal 100), the processor 150 may determine that the wake-up command utterance is valid. In this case, the processor 150 may transition the state of the user terminal 100 to a wake-up state capable of recognizing or processing voice data according to a user utterance (e.g., an utterance including a specific command or intent) associated with task execution.

Figure 6:
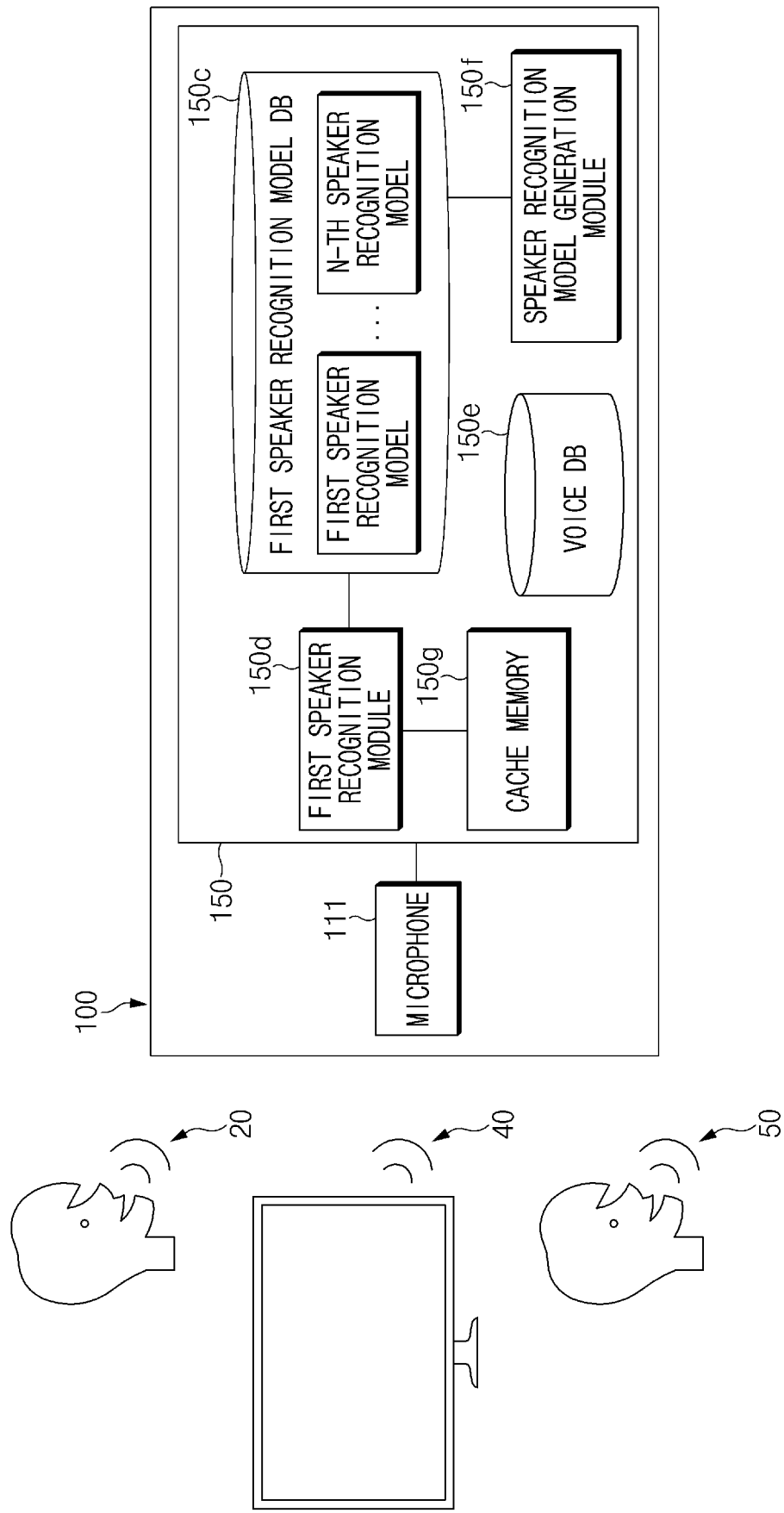
FIG. 6 is a diagram illustrating a speaker identification-based utterance processing form of a user terminal according to an embodiment.
Figure 7:
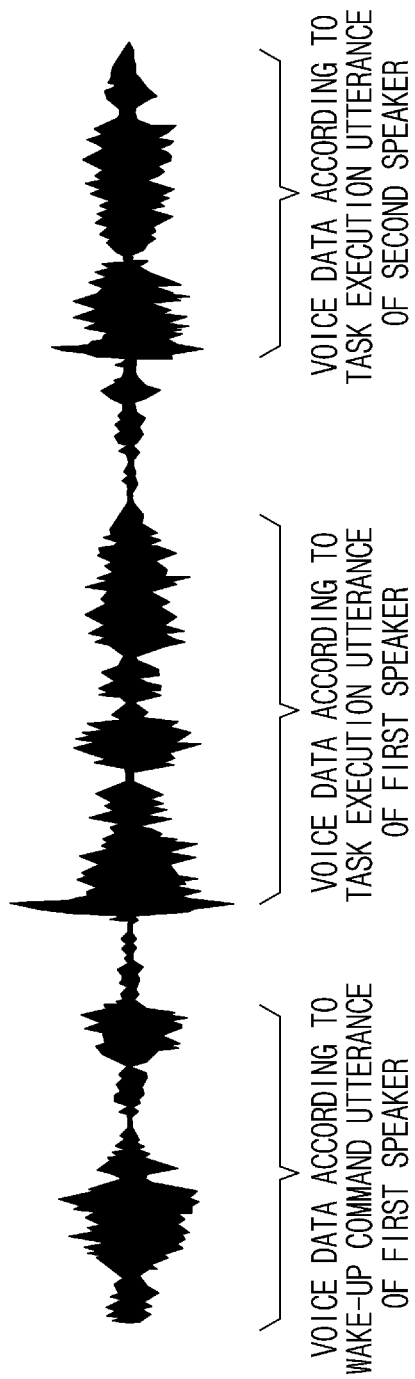
FIG. 7 is a diagram illustrating a form of voice data received by a user terminal according to an embodiment.

FIG. 6 is a diagram illustrating a speaker identification-based utterance processing form of a user terminal according to an embodiment. FIG. 7 is a diagram illustrating a form of voice data received by a user terminal according to an embodiment.

Referring to FIG. 6, the processor 150 of the user terminal 100 may learn or train the utterance 20 by the specified at least one speaker to identify the utterance 20 by the specified at least one speaker from the environment of noise (e.g., the sound 40 of a sound medium, the utterance 50 of other people, or the like). In an embodiment, the specified at least one speaker may include the actual user of the user terminal 100 and/or at least another person (e.g., the family of the actual user, a friend of the actual user, or the like) set by the actual user. In this regard, the processor 150 may further include at least one of a voice DB 150e, a speaker recognition model generation module 150f, or a cache memory 150g, in addition to the above-described first speaker recognition model DB 150c and the above-described first speaker recognition module 150d.

The speaker recognition model generation module 150f may generate a speaker recognition model corresponding to each of the specified at least one speaker. In this regard, the processor 150 may receive utterances (e.g., utterance sentences or utterances performed multiple times under a condition that the surrounding environment of the user terminal 100 is identical) multiple times from each speaker through the microphone 111 upon setting the specified at least one speaker on the user terminal 100 (or on the integrated intelligence system (e.g., 10 in FIG. 1A)). The processor 150 may store (e.g., store voice data in a table format) voice data according to the received utterance in the voice DB 150e for each speaker. Alternatively, in various embodiments, the processor 150 may store the voice, which is collected upon operating a specific function (e.g., a voice recording function, a voice trigger function, a call function, or the like) mounted on the user terminal 100, in the voice DB 150e.

In an embodiment, the speaker recognition model generation module 150f may identify the reference utterance (e.g., the utterance of the first speaker received by the user terminal 100) of the first speaker with reference to the voice DB 150e, and may generate the first speaker recognition model corresponding to the first speaker, using the statistical feature of feature vectors extracted on the reference utterance. For example, the statistical feature may include the distribution of difference values between the feature vector extracted from the reference utterance of the first speaker and the feature vector extracted from the utterance other than the reference utterance among utterances generated multiple times by the first speaker. The speaker recognition model generation module 150f may store the first speaker recognition model generated in association with the first speaker, in the first speaker recognition model DB 150c. As in the above description, the speaker recognition model generation module 150f may generate at least one speaker recognition model corresponding to the specified at least one speaker and may store the at least one speaker recognition model in the first speaker recognition model DB 150c.

In an embodiment, the processor 150 may receive a wake-up command utterance performed from an arbitrary speaker through the microphone 111 and may transmit the voice data according to the wake-up command utterance to the first speaker recognition module 150d. The first speaker recognition module 150d may determine whether the voice data received from the processor 150 corresponds to at least one speaker recognition model stored in the first speaker recognition model DB 150c. In this regard, at least one speaker recognition model stored in the first speaker recognition model DB 150c may be referenced in Equation 3 described above; the first speaker recognition module 150d may calculate the third score $SCORE_{SPK1}$ by substituting the voice data received from the processor 150 into the at least one speaker recognition model. As described above, when the calculated third score $SCORE_{SPK1}$ is not less than the specified fourth reference value $Th_{SPK2}$, the first speaker recognition module 150d may determine that the voice data according to the wake-up command utterance received from the processor 150 corresponds to the speaker recognition model referenced in Equation 3. When the calculated third score $SCORE_{SPK1}$ is not less than the specified third reference value $Th_{SPK1}$ and is less than the fourth reference value $Th_{SPK2}$, the first speaker recognition module 150d may determine whether the voice data received from the processor 150 corresponds to the speaker recognition model stored in the first speaker recognition model DB 150c, based on the recognition information about the voice data provided from the intelligence server (e.g., 200 in FIG. 4). In other words, when only the speaker recognition model corresponding to the actual user of the user terminal 100 is generated by the speaker recognition model generation module 150f, the first speaker recognition module 150d may determine whether the voice data according to the received wake-up command utterance corresponds to the speaker recognition model corresponding to the actual user one to one. As such, when a plurality of speaker recognition models (e.g., a speaker recognition model corresponding to the actual user of the user terminal 100 and a speaker recognition model corresponding to at least another person set by the actual user) are generated by the speaker recognition model generation module 150f, the first speaker recognition module 150d may determine whether the voice data according to the received wake-up command utterance corresponds to at least one of the plurality of speaker recognition models.

In an embodiment, when it is determined that the voice data received from the processor 150 corresponds to at least one speaker recognition model stored in the first speaker recognition model DB 150c, the first speaker recognition module 150d may store a speaker recognition model corresponding to the voice data in the cache memory 150g. Furthermore, the processor 150 may transition the state of the user terminal 100 to a wake-up state capable of recognizing or processing the voice data according to a user utterance (e.g., an utterance including a specific command or intent) associated with task execution, based on the determination of the first speaker recognition module 150d. In various embodiments, the fact that the state of the user terminal 100 is transitioned to the wake-up state may mean that the speech recognition service function is activated on the user terminal 100 (or on the integrated intelligence system (e.g., 10 in FIG. 1A)).

In an embodiment, the end-point detection module (e.g., 167 of FIG. 3A) of the preprocessing module (e.g., 160 of FIG. 3A) may operate under the control of the processor 150, and may determine that data entered at the time after the state of the user terminal 100 is changed to the wake-up state corresponds to a data section. In this regard, the end-point detection module 167 may perform framing on the entered data at a specified interval or period and may extract voice information from each voice data corresponding to at least one frame. The end-point detection module 167 may compare voice information extracted from respective voice data with a specified threshold value and may determine that data including voice information of the threshold value or more is voice data. Moreover, the end-point detection module 167 may determine at least one frame including voice information of the threshold value or more as a voice data section. In an embodiment, the data entered after the wake-up state may include voice data according to the utterance 20 (e.g., an utterance including a command or intent associated with task execution) of the specified speaker. Alternatively, the data entered after the wake-up state may further include noise data (e.g., the sound or voice data according to the sound 40 output from sound media, voice data according to the utterance 50 of other people, or the like) according to surrounding noise in addition to the voice data according to the utterance 20 of the specified speaker.

In an embodiment, the first speaker recognition module 150d may determine whether the voice data determined by the end-point detection module 167 corresponds to the speaker recognition model stored in the cache memory 150g or the first speaker recognition model DB 150c. For example, the first speaker recognition module 150d may determine whether the determined voice data corresponds to the speaker recognition model referenced in Equation 3, by substituting the voice data determined by the end-point detection module 167 into the speaker recognition model $\lambda_{SPK1}$ and the specified background speaker model $\lambda_{UBM}$, which are stored in the cache memory 150g or the first speaker recognition model DB 150c to calculate the third score $SCORE_{SPK1}$. At this time, considering that the determined data is the voice data of the utterance 20 performed by the same speaker as a speaker of the wake-up command utterance, the first speaker recognition module 150d may preferentially refer to the speaker recognition model stored in the cache memory 150g upon determining the correspondence.

According to an embodiment, at least partial data (hereinafter referred to as "first data") of the voice data determined by the end-point detection module 167 may correspond to a speaker recognition model stored in the cache memory 150g or the first speaker recognition model DB 150c. In this case, the first speaker recognition module 150d may determine the first data as the voice data according to the utterance 20 (e.g., an utterance including a command or intent associated with task execution) of the specified speaker. Accordingly, the end-point detection module 167 may identify the voice data according to the utterance 20 of the specified speaker determined by the first speaker recognition module 150d (or the processor 150), in the determined voice data section. The end-point detection module 167 may determine the first frame corresponding to the identified voice data as a starting point of the utterance 20 performed by the specified speaker, and may determine the final frame as the end-point of the utterance 20 performed by the specified speaker. The processor 150 may transmit the voice data preprocessed (e.g., detection of a starting point and an end-point) by the end-point detection module 167 to the intelligence server 200. According to an embodiment, the voice data determined by the end-point detection module 167 among pieces of data entered into the user terminal 100 after the wake-up state may include the noise data. In this case, as the noise data does not correspond to the speaker recognition model stored in the cache memory 150g or the first speaker recognition model DB 150c, the first speaker recognition module 150d (or the processor 150) may not determine the noise data as the voice data according to the utterance 20 of the specified speaker, and the end-point detection module 167 may exclude the preprocessing (e.g., detection of a starting point and an end-point) of the noise data.

According to various embodiments, after the framing of the end-point detection module 167 for the data entered after the wake-up state is changed is completed, determining, by the end-point detection module 167, voice data including voice information of the threshold value or more, and determining, by the first speaker recognition module 150d (or the processor 150), whether the input data corresponds to the speaker recognition model may be performed at a similar time. In this case, a period in which the first speaker recognition module 150d determines the correspondence for at least one frame according to the input data may be later than a period in which the end-point detection module 167 determines the voice data for the at least one frame as the third score calculation processing based on Equation 3 described above is accompanied. In other words, even though the determination of voice data (or frame) including voice information of the threshold value or more is completed, the end-point detection module 167 may not determine whether the determined voice data is voice data according to the utterance 20 of the specified speaker, and may fail to perform the preprocessing (e.g., detection of a starting point and an end-point) of voice data according to the specified user utterance 20. In this regard, to overcome the delay in performing the preprocessing, when the first frame including data corresponding to the speaker recognition model is determined by the first speaker recognition module 150d (or the processor 150), the end-point detection module 167 may determine the first frame as the starting point of the voice data section according to the utterance 20 of the specified speaker.

Furthermore, the end-point detection module 167 may designate an arbitrary first frame, which is determined (hereinafter referred to as "first determination") to include data including voice information of the specified threshold value or more and determined (hereinafter referred to as "second determination") to include data corresponding to the speaker recognition model, as the starting point, and may designate the specified number of frames as the end-point determination section of voice data according to the utterance 20 of the specified speaker. The end-point detection module 167 may count the number of frames in each of which the first determination and second determination are continued from the first frame. When the counted at least one frame is less than the specified number of frames from the first frame, the end-point detection module 167 may determine up to the specified number of frames as the end-point of voice data according to the utterance 20 of the specified speaker.

In various embodiments, the weight for determining, by the end-point detection module 167, voice data including voice information of the threshold value or more, and the weight for determining whether the data entered into the first speaker recognition module 150d corresponds to the speaker recognition model may be adjusted mutually. For example, when the weight at which the end-point detection module 167 determines the voice data is set to the first value (e.g., 0.0~ 1.0), the weight at which the first speaker recognition module 150*d* determines whether the input data corresponds to the speaker recognition model may be set to a second value (e.g., 1.0—the first value). In this case, the threshold value or reference value associated with the determination of the voice data and the determination of whether the input data corresponds to the speaker recognition model may be adjusted by a predetermined amount depending on the magnitude of the first value and second value. For example, when the weight at which the end-point detection module 167 determines the voice data is set to be greater than the weight at which the first speaker recognition module 150*d* determines whether the input data corresponds to the speaker recognition model (or when the first value is set to be greater than the second value), the threshold value at which the end-point detection module 167 determines the voice data may be lowered by a predetermined amount. Alternatively, the reference value (e.g., the third reference value $Th_{SPK1}$ and/or the fourth reference value $Th_{SPK2}$) at which the first speaker recognition module 150*d* determines whether the input data corresponds to the speaker recognition model may be increased by a predetermined amount. As such, when the weight at which the end-point detection module 167 determines the voice data is set to be smaller than the weight at which the first speaker recognition module 150*d* determines whether the input data corresponds to the speaker recognition model (or when the first value is set to be smaller than the second value), the threshold value at which the end-point detection module 167 determines the voice data may be increased by a predetermined amount, and the reference value (e.g., the third reference value $Th_{SPK1}$ and/or the fourth reference value $Th_{SPK2}$) at which the first speaker recognition module 150*d* determines whether the input data corresponds to the speaker recognition model may be decreased by a predetermined amount.

Referring to FIG. 7, the data entered into the user terminal 100 after the wake-up state may include pieces of voice data according to the utterances (e.g., utterances including a command or intent associated with task execution) of the specified plurality of speakers. For example, the data entered into the user terminal 100 after the wake-up state may include the first voice data according to the utterance of the specified first speaker performing a wake-up command utterance and the second voice data according to the utterance of the specified second speaker. In this case, the user terminal 100 may calculate the third score $SCORE_{SPK1}$ by substituting the first voice data according to the utterance of the first speaker into the above-described speaker recognition model $\lambda_{SPK1}$ and the above-described background speaker model $\lambda_{UBM}$. As such, the user terminal 100 may calculate the third score $SCORE_{SPK1}$ by substituting the second voice data according to the utterance of the second speaker into the speaker recognition model $\lambda_{SPK1}$ and the background speaker model $\lambda_{UBM}$. In this operation, when the third score calculated for the second speaker is at least partially different from the third score previously calculated for the first speaker, the user terminal 100 may recognize that a speaker is changed, and may refer to another speaker recognition model to calculate the third score for the second speaker. In this regard, referring to the details described above, as the first speaker and the second speaker correspond to the specified speakers on the user terminal 100, speaker recognition models respectively corresponding to the specified first speaker and the specified second speaker are generated by the speaker recognition model generation module 150*f*, and the generated speaker recognition models may be stored in the first speaker recognition model DB 150*c* or the cache memory 150*g*.

In an embodiment, the user terminal 100 may determine that the speaker is changed using at least part of the second voice data according to the utterance of the second speaker. In an embodiment, when the user terminal 100 receives the utterance of the second speaker including the specified word before the utterance corresponding to the second voice data, the user terminal 100 may determine that the speaker is changed. For example, the specified word may be a wake-up command utterance (e.g., Hi Bixby) for activating the user terminal 100.

Accordingly, the first speaker recognition module 150*d* may determine the first voice data and the second voice data as voice data by the utterances of the specified speakers, with reference to the speaker recognition models stored in the first speaker recognition model DB 150*c* or the cache memory 150*g*. The end-point detection module (e.g., 167 in FIG. 3A) may detect the starting point and end-point of the first voice data and the second voice data, based on the determination of the first speaker recognition module 150*d* (or the processor 150), and the processor 150 may transmit first voice data and second voice data, from which the starting point and end-point are detected, to the intelligence server 200. As such, even though the data entered at the time after the change to the wake-up state includes voice data of another speaker other than the voice data of the speaker performing the wake-up command utterance, when it is determined that the other speaker is the specified speaker other than other people, the processor 150 in the user terminal 100 may recognize and process voice data of the other speaker.

Figure 8:
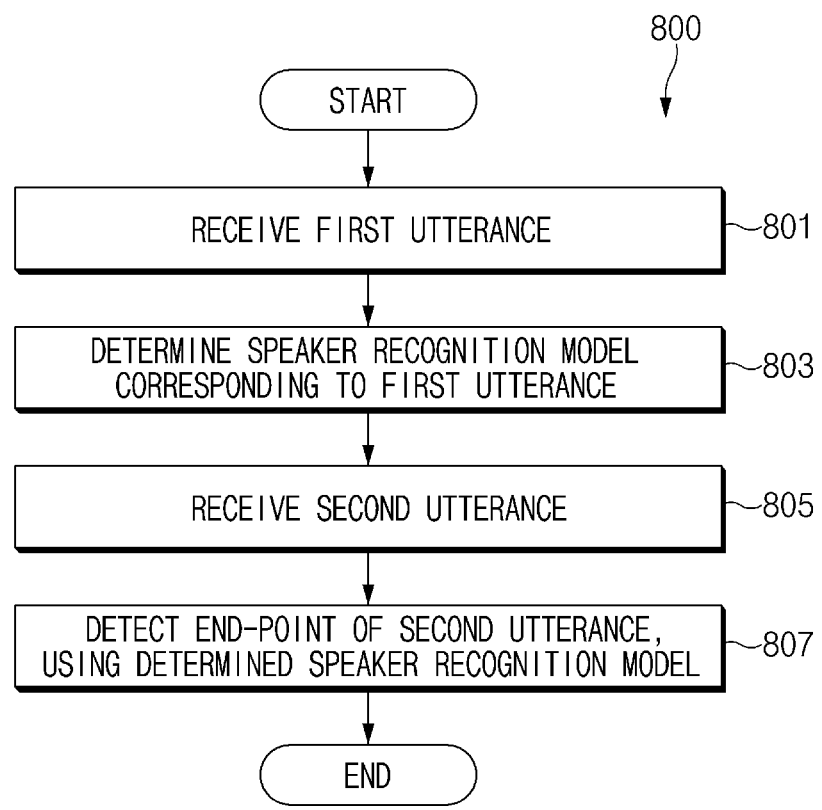
FIG. 8 is a diagram illustrating a user voice input processing method of a user terminal according to an embodiment.

FIG. 8 is a diagram illustrating a user voice input processing method of a user terminal according to an embodiment.

Referring to FIG. 8, in operation 801, a user terminal (e.g., 100 in FIG. 1B) may receive a first utterance through a microphone (e.g., 111 in FIG. 1C). For example, the first utterance may include a wake-up command utterance for changing the state of the user terminal 100 into a state (e.g., wake-up state) capable of recognizing or processing utterance associated with task execution. In an embodiment, voice data according to the first utterance may be processed by a wake-up recognition module (e.g., 148 of FIG. 4A) included in the memory (e.g., 140 of FIG. 1B) or a processor (e.g., 150 of FIG. 4A). For example, the wake-up recognition module 148 or the processor 150 may determine whether a specified word is included in the voice data according to the first utterance in association with the state change of the user terminal 100, based on the specified keyword recognition model. It may be understood that the following operations are performed when the specified word is included in voice data according to the first utterance.

In operation 803, the processor 150 may determine a speaker recognition model corresponding to the first utterance. In this regard, the processor 150 may determine whether the voice data according to the first utterance corresponds to at least one speaker recognition model stored in the first speaker recognition model DB (e.g., 150*c* of FIG. 6). For example, the processor 150 may calculate a score (e.g., the third score $SCORE_{SPK}$) for the voice data according to the first utterance based on the equation (e.g., Equation 3) to which the at least one speaker recognition model is referenced, and may determine that the speaker recognition model, which is referenced when the calculated score corresponds to a specified reference value (e.g., the fourth reference value $Th_{SPK2}$) or more, is a speaker recognition model corresponding to the first utterance. As such, when the voice data according to the first utterance corresponds to one of the at least one speaker recognition model, the processor 150 may determine that the first utterance is performed by at least one specified speaker and may store the determined speaker recognition model in a cache memory (e.g., 150g in FIG. 6).

In an embodiment, as the voice data according to the first utterance includes a specified word in association with the state change of the user terminal 100 and the first utterance is determined to be performed by at least one specified speaker, the processor 150 may determine that the first utterance is valid, and may change the state of the user terminal 100 to a state (e.g., a wake-up state) capable of recognizing or processing the utterance associated with task execution.

In operation 805, the user terminal 100 may receive a second utterance through the microphone 111. For example, the second utterance may be an utterance performed by a speaker identical to or different from the speaker of the first utterance and may include a command or intent associated with specific task execution. According to various embodiments, the user terminal 100 may receive the noise (e.g., the sound or voice output from sound media, utterances of other people, or the like) generated in the operating environment of the user terminal 100 together with the second utterance.

According to an embodiment, when the second utterance is the utterance performed by the different speaker, the user terminal 100 may recognize that the speaker is changed. For example, the user terminal 100 may recognize that the speaker is changed, using at least part of the second utterance. Besides, the user terminal 100 may recognize that the speaker is changed, by receiving the utterance including the specified word before the second utterance to recognize the specified utterance. For example, the specified word may be a word for activating the user terminal 100. Because the user terminal 100 is already activated by the first utterance, the user terminal 100 may recognize that the speaker is changed, through the specified word without changing the state again.

In operation 807, the processor 150 may detect the end-point of the second utterance, using the determined speaker recognition model. In this regard, the processor 150 may determine whether the voice data according to the second utterance corresponds to the determined speaker recognition model. For example, similarly to the details described above, the processor 150 may calculate a score based on the equation (e.g., Equation 3 described above) in which the determined speaker recognition model is referenced, with respect to the voice data according to the second utterance; when the score is not less than a specified reference value, the processor 150 may determine that voice data according to the second utterance corresponds to the determined speaker recognition model. In this case, the processor 150 may detect the starting point and end-point of the voice data according to the second utterance. The processor 150 may transmit the voice data of the second utterance, in which the starting point and the end-point are detected, to the intelligence server (e.g., 200 in FIG. 1D).

In various embodiments, when the noise is received together with the second utterance through the microphone 111, the processor 150 may further determine whether the sound or voice data according to the noise corresponds to the determined speaker recognition model or at least one speaker recognition model stored in the first speaker recognition model DB 150c. As described above, the speaker recognition model may be generated to correspond to at least one specified speaker. The sound or voice data according to the noise may not correspond to at least one speaker recognition model included in the user terminal 100. Accordingly, the processor 150 determines that the sound or voice data according to the noise is noise data unnecessary to operate a speech recognition service, and thus may exclude preprocessing (e.g., end-point detection or the like) and transmission to the intelligence server 200.

In various embodiments, when the voice data according to the second utterance does not correspond to the determined speaker recognition model, the processor 150 may determine that the second utterance is performed by a speaker different from the speaker performing the first utterance (e.g., a wake-up command utterance). In this case, the processor 150 may determine whether the second utterance is performed by at least one specified speaker, by determining whether the voice data according to the second utterance corresponds to at least one speaker recognition model stored in the first speaker recognition model DB 150c. When the voice data according to the second utterance correspond to one of at least one speaker recognition model stored in the first speaker recognition model DB 150c, the processor 150 may determine that the second utterance is performed by at least one specified speaker (e.g., a speaker other than the speaker performing first utterance among at least one specified speaker). Accordingly, the processor 150 may detect the end-point of the voice data with reference to the speaker recognition model corresponding to the voice data of the second utterance, and may transmit the voice data, in which the end-point is detected, to the intelligence server 200.

In various embodiments, when the voice data according to the second utterance does not correspond to any one of the determined speaker recognition model or at least one speaker recognition model stored in the first speaker recognition model DB 150c, the processor 150 may delete the speaker recognition model stored in the cache memory 150g after a specified time elapses from the determination of the correspondence.

Figure 9:
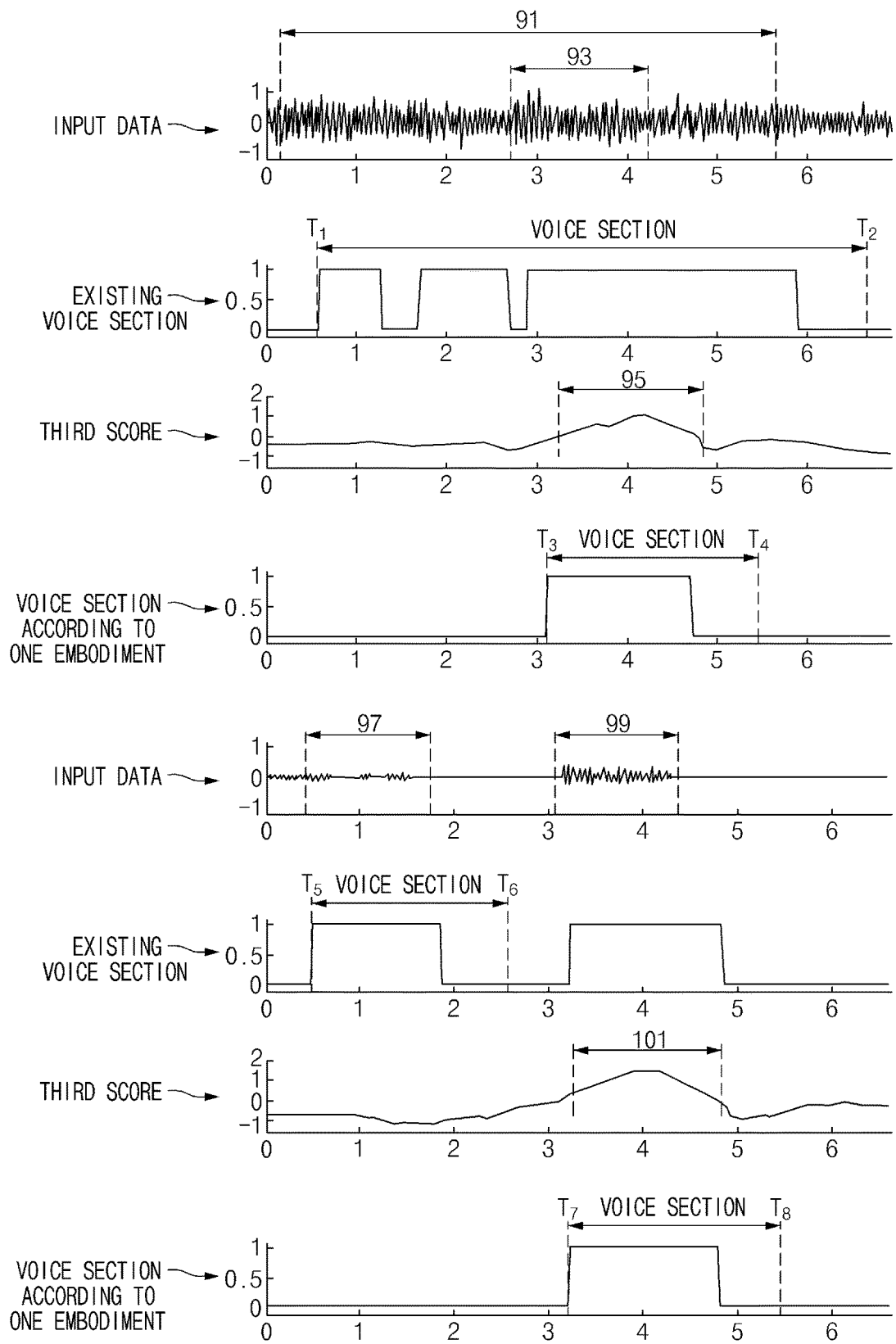
FIG. 9 is a diagram illustrating an example of a simulation for a user voice input processing type of a user terminal according to an embodiment.

FIG. 9 is a diagram illustrating an example of a simulation for a user voice input processing type of a user terminal according to an embodiment.

Referring to FIG. 9, various noises other than a specified user utterance may be present in the operating environment of the user terminal (e.g., 100 in FIG. 2). For example, when the user terminal 100 is located within transportation (e.g., a bus, a subway, or the like), the sound (e.g., announcements, or the like) output from the transportation may operate as the noise mixed with the voice according to the user utterance received by the user terminal 100. As such, referring to the conventional preprocessing (e.g., end-point detection) method for a case where sound data 91 according to the sound of the transportation is mixed with voice data 93 according to a user utterance in the user terminal 100, a starting point T1 and an end-point T2 may be detected based on both the input data 91 and 93, and thus not only the voice data 93 but also the sound data 91 may be determined as a voice section without identifying the voice data 93 according to the user utterance. In this case, the recognition rate of the voice data 93 according to the user utterance may decrease, or an appropriate response of the user terminal 100 to the user utterance may not be provided.

In this regard, the user terminal 100 according to an embodiment of the disclosure may identify the voice data 93 according to the specified user utterance in a noise environment, by generating and storing a speaker recognition model for a specified user to recognize the utterance performed by the specified user, based on the speaker recognition model.

In this regard, the user terminal 100 may calculate a score (e.g., the third score) by substituting the received data 91 and 93 into the speaker recognition model, and may compare the calculated score with a specified threshold value. The user terminal 100 may determine a data section 95, in which the calculated score is not less than the specified threshold value, as the voice data 93 according to the utterance of the specified user. To process the determined voice data 93, the user terminal 100 may transmit data of the voice section according to detection of a starting point T3 and an end-point T4 to an intelligence server (200 in FIG. 1A).

As another example of the noise, the user terminal 100 may receive utterances of other people other than the specified user. For example, the user terminal 100 may receive voice data 97 according to utterances of the other people and may receive voice data 99 according to the utterance of the specified user after a predetermined time elapses from the time when the voice data 97 is received. As such, referring to the conventional preprocessing (e.g., end-point detection) method for a case where pieces of voice data 97 and 99 are entered with a predetermined interval, the starting point and end-point of the remaining voice data 99 may be detected without identifying the voice data 99 according to the specified user utterance after the voice section according to a starting point T5 and an end-point T6 of the voice data 97, which is entered first based on the time, is detected. In this case, the processing time of the voice data 99 according to the specified user utterance may be delayed, or the response time of the user terminal 100 to the user utterance may be delayed.

As described above, the user terminal 100 according to an embodiment of the disclosure may calculate a score (e.g., the third score) by substituting each of the received voice data 97 and 99 into the specified speaker recognition model, and may determine a data section 101 corresponding to a score of a specified threshold value or more as the voice data 99 according to the specified user utterance. To process the voice data 99 having a score of the specified threshold value or more, the user terminal 100 may transmit data of the voice section according to the detection of a starting point T7 and an end-point T8, to the intelligence server 200.

According to various embodiments described above, an electronic device may include a speaker, a microphone, a communication interface, a processor operatively connected to the speaker, the microphone, and the communication interface, and a memory operatively connected to the processor.

According to various embodiments, the memory may store instructions that, when executed, cause the processor to receive a first utterance through the microphone, to determine a speaker model by performing speaker recognition on the first utterance, to receive a second utterance through the microphone after the first utterance is received, to detect an end-point of the second utterance, at least partially using the determined speaker model.

According to various embodiments, the first utterance may include at least one predetermined wake-up word.

According to various embodiments, the second utterance may include an utterance including a command or intent associated with a task to be performed through the electronic device.

According to various embodiments, the instructions may, when executed, cause the processor to generate at least one speaker model corresponding to at least one specified speaker to store the at least one speaker model in a database.

According to various embodiments, the instructions may, when executed, cause the processor to activate a speech recognition service function, which is embedded in the electronic device or provided from an external server, in response to receiving the first utterance when voice data associated with the first utterance corresponds to at least one of the at least one speaker model stored in the database.

According to various embodiments, the instructions may, when executed, cause the processor to determine a speaker model corresponding to the voice data associated with the first utterance to store the speaker model in a cache memory.

According to various embodiments, the instructions may, when executed, cause the processor to detect the end-point of the second utterance when voice data associated with the second utterance corresponds to at least one of the speaker model stored in the cache memory or the at least one speaker model stored in the database.

According to various embodiments, the instructions may, when executed, cause the processor to transmit the voice data associated with the second utterance, in which the end-point is detected, to the external server.

According to various embodiments, the instructions may, when executed, cause the processor to exclude detection of the end-point of the second utterance when voice data associated with the second utterance does not correspond to the speaker model stored in the cache memory or the at least one speaker model stored in the database.

According to various embodiments, the instructions may, when executed, cause the processor to delete the speaker model stored in the cache memory after a specified time elapses when the voice data associated with the second utterance does not correspond to the speaker model stored in the cache memory or the at least one speaker model stored in the database.

According to various embodiments described above, a user voice input processing method of an electronic device may include receiving a first utterance through a microphone mounted on the electronic device, determining a speaker model by performing speaker recognition on the first utterance, receiving a second utterance through the microphone after the first utterance is received, and detecting an end-point of the second utterance, at least partially using the determined speaker model.

According to various embodiments, the receiving of the first utterance may include receiving at least one predetermined wake-up word.

According to various embodiments, the receiving of the second utterance may include receiving an utterance including a command or intent associated with a task to be performed through the electronic device.

According to various embodiments, the user voice input processing method may further include generating at least one speaker model corresponding to at least one specified speaker to store the at least one speaker model in a database.

According to various embodiments, the receiving of the first utterance may include activating a speech recognition service function, which is embedded in the electronic device or provided from an external server, when voice data associated with the first utterance corresponds to at least one of the at least one speaker model stored in the database.

According to various embodiments, the determining of the speaker model may include determining a speaker model corresponding to the voice data associated with the first utterance to store the speaker model in a cache memory.

According to various embodiments, the detecting of the end-point of the second utterance may include detecting the end-point of the second utterance when voice data associated with the second utterance corresponds to at least one of the speaker model stored in the cache memory or the at least one speaker model stored in the database.

According to various embodiments, the detecting of the end-point of the second utterance may include transmitting the voice data associated with the second utterance, in which the end-point is detected, to the external server.

According to various embodiments, the detecting of the end-point of the second utterance may include excluding the detection of the end-point of the second utterance when voice data associated with the second utterance does not correspond to the speaker model stored in the cache memory or the at least one speaker model stored in the database.

According to various embodiments, the detecting of the end-point of the second utterance may include deleting the speaker model stored in the cache memory after a specified time elapses when the voice data associated with the second utterance does not correspond to the speaker model stored in the cache memory or the at least one speaker model stored in the database.

Figure 10:
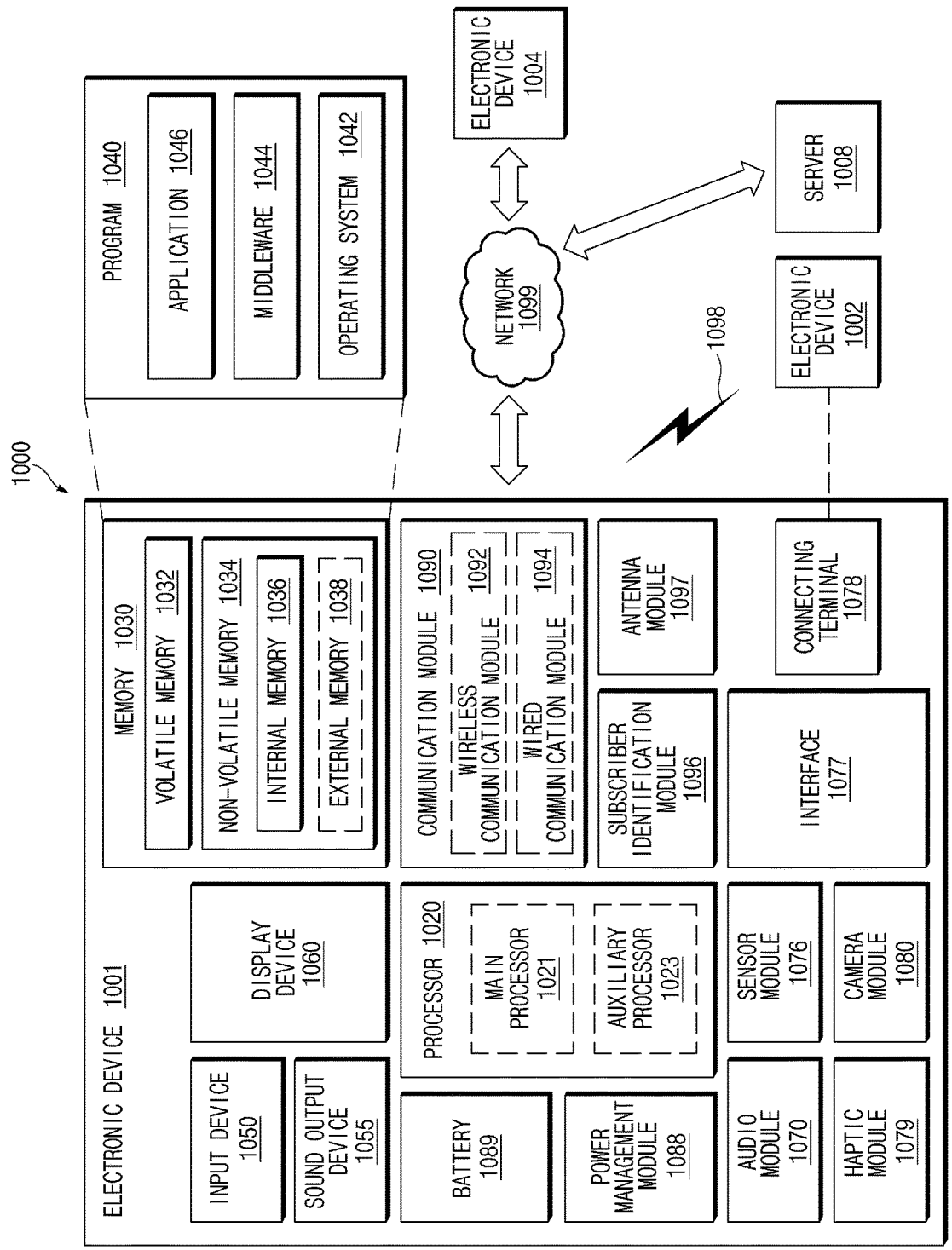
FIG. 10 is a block diagram of an electronic device in a network environment according to an embodiment.

FIG. 10 is a block diagram of an electronic device in a network environment according to various embodiments.

Referring to FIG. 10, an electronic device 1001 may communicate with an electronic device 1002 through a first network 1098 (e.g., a short-range wireless communication) or may communicate with an electronic device 1004 or a server 1008 through a second network 1099 (e.g., a long-distance wireless communication) in a network environment 1000. According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, and an antenna module 1097. According to some embodiments, at least one (e.g., the display device 1060 or the camera module 1080) among components of the electronic device 1001 may be omitted or other components may be added to the electronic device 1001. According to some embodiments, some components may be integrated and implemented as in the case of the sensor module 1076 (e.g., a fingerprint sensor, an iris sensor, or an illuminance sensor) embedded in the display device 1060 (e.g., a display).

The processor 1020 may operate, for example, software (e.g., a program 1040) to control at least one of other components (e.g., a hardware or software component) of the electronic device 1001 connected to the processor 1020 and may process and compute a variety of data. The processor 1020 may load a command set or data, which is received from other components (e.g., the sensor module 1076 or the communication module 1090), into a volatile memory 1032, may process the loaded command or data, and may store result data into a nonvolatile memory 1034. According to an embodiment, the processor 1020 may include a main processor 1021 (e.g., a central processing unit or an application processor) and an auxiliary processor 1023 (e.g., a graphic processing device, an image signal processor, a sensor hub processor, or a communication processor), which operates independently from the main processor 1021, additionally or alternatively uses less power than the main processor 1021, or is specified to a designated function. In this case, the auxiliary processor 1023 may operate separately from the main processor 1021 or embedded.

In this case, the auxiliary processor 1023 may control, for example, at least some of functions or states associated with at least one component (e.g., the display device 1060, the sensor module 1076, or the communication module 1090) among the components of the electronic device 1001 instead of the main processor 1021 while the main processor 1021 is in an inactive (e.g., sleep) state or together with the main processor 1021 while the main processor 1021 is in an active (e.g., an application execution) state. According to an embodiment, the auxiliary processor 1023 (e.g., the image signal processor or the communication processor) may be implemented as a part of another component (e.g., the camera module 1080 or the communication module 1090) that is functionally related to the auxiliary processor 1023. The memory 1030 may store a variety of data used by at least one component (e.g., the processor 1020 or the sensor module 1076) of the electronic device 1001, for example, software (e.g., the program 1040) and input data or output data with respect to commands associated with the software. The memory 1030 may include the volatile memory 1032 or the nonvolatile memory 1034.

The program 1040 may be stored in the memory 1030 as software and may include, for example, an operating system 1042, a middleware 1044, or an application 1046.

The input device 1050 may be a device for receiving a command or data, which is used for a component (e.g., the processor 1020) of the electronic device 1001, from an outside (e.g., a user) of the electronic device 1001 and may include, for example, a microphone, a mouse, or a keyboard.

The sound output device 1055 may be a device for outputting a sound signal to the outside of the electronic device 1001 and may include, for example, a speaker used for general purposes, such as multimedia play or recordings play, and a receiver used only for receiving calls. According to an embodiment, the receiver and the speaker may be either integrally or separately implemented.

The display device 1060 may be a device for visually presenting information to the user of the electronic device 1001 and may include, for example, a display, a hologram device, or a projector and a control circuit for controlling a corresponding device. According to an embodiment, the display device 1060 may include a touch circuitry or a pressure sensor for measuring an intensity of pressure on the touch.

The audio module 1070 may convert a sound and an electrical signal in dual directions. According to an embodiment, the audio module 1070 may obtain the sound through the input device 1050 or may output the sound through an external electronic device (e.g., the electronic device 1002 (e.g., a speaker or a headphone)) wired or wirelessly connected to the sound output device 1055 or the electronic device 1001.

The sensor module 1076 may generate an electrical signal or a data value corresponding to an operating state (e.g., power or temperature) inside or an environmental state outside the electronic device 1001. The sensor module 1076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1077 may support a designated protocol wired or wirelessly connected to the external electronic device (e.g., the electronic device 1002). According to an embodiment, the interface 1077 may include, for example, an HDMI (high-definition multimedia interface), a USB (universal serial bus) interface, an SD card interface, or an audio interface.

A connecting terminal 1078 may include a connector that physically connects the electronic device 1001 to the external electronic device (e.g., the electronic device 1002), for example, an HDMI connector, a USB connector, an SD card connector, or an audio connector (e.g., a headphone connector).

The haptic module 1079 may convert an electrical signal to a mechanical stimulation (e.g., vibration or movement) or an electrical stimulation perceived by the user through tactile or kinesthetic sensations. The haptic module 1079 may include, for example, a motor, a piezoelectric element, or an electric stimulator.

The camera module 1080 may shoot a still image or a video image. According to an embodiment, the camera module 1080 may include, for example, at least one lens, an image sensor, an image signal processor, or a flash.

The power management module 1088 may be a module for managing power supplied to the electronic device 1001 and may serve as at least a part of a power management integrated circuit (PMIC).

The battery 1089 may be a device for supplying power to at least one component of the electronic device 1001 and may include, for example, a non-rechargeable (primary) battery, a rechargeable (secondary) battery, or a fuel cell.

The communication module 1090 may establish a wired or wireless communication channel between the electronic device 1001 and the external electronic device (e.g., the electronic device 1002, the electronic device 1004, or the server 1008) and support communication execution through the established communication channel. The communication module 1090 may include at least one communication processor operating independently from the processor 1020 (e.g., the application processor) and supporting the wired communication or the wireless communication. According to an embodiment, the communication module 1090 may include a wireless communication module 1092 (e.g., a cellular communication module, a short-range wireless communication module, or a GNSS (global navigation satellite system) communication module) or a wired communication module 1094 (e.g., an LAN (local area network) communication module or a power line communication module) and may communicate with the external electronic device using a corresponding communication module among them through the first network 1098 (e.g., the short-range communication network such as a Bluetooth, a WiFi direct, or an IrDA (infrared data association)) or the second network 1099 (e.g., the long-distance wireless communication network such as a cellular network, an internet, or a computer network (e.g., LAN or WAN)). The above-mentioned various communication modules 1090 may be implemented into one chip or into separate chips, respectively.

According to an embodiment, the wireless communication module 1092 may identify and authenticate the electronic device 1001 using user information stored in the subscriber identification module 1096 in the communication network.

The antenna module 1097 may include one or more antennas to transmit or receive the signal or power to or from an external source. According to an embodiment, the communication module 1090 (e.g., the wireless communication module 1092) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1001 and the external electronic device 1004 through the server 1008 connected to the second network 1099. Each of the electronic devices 1002 and 1004 may be the same or different types as or from the electronic device 1001. According to an embodiment, all or some of the operations performed by the electronic device 1001 may be performed by another electronic device or a plurality of external electronic devices. When the electronic device 1001 performs some functions or services automatically or by request, the electronic device 1001 may request the external electronic device to perform at least some of the functions related to the functions or services, in addition to or instead of performing the functions or services by itself. The external electronic device receiving the request may carry out the requested function or the additional function and transmit the result to the electronic device 1001. The electronic device 1001 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 1040) including an instruction stored in a machine-readable storage media (e.g., an internal memory 1036 or an external memory 1038) readable by a machine (e.g., a computer). The machine may be a device that calls the instruction from the machine-readable storage media and operates depending on the called instruction and may include the electronic device (e.g., the electronic device 1001). When the instruction is executed by the processor (e.g., the processor 1020), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a speaker;
a microphone;
a communication interface;
a processor operatively connected to the speaker, the microphone, and the communication interface; and
a memory operatively connected to the processor,
wherein the memory stores instructions that, when executed, cause the processor to:
receive a first utterance through the microphone;
determine a speaker model by performing speaker recognition on the first utterance;
receive a second utterance through the microphone after the first utterance is received;
determine a plurality of sections including voice information from voice data associated with the second utterance;
determine a section correspond to the speaker model among the plurality of sections, as a voice section of the voice data; and
determine others section does not correspond to the speaker model among the plurality of sections, as a noise section of the voice data.

2. The electronic device of claim 1, wherein the first utterance includes at least one predetermined wake-up word and wherein the second utterance includes an utterance including a command or intent associated with a task to be performed through the electronic device.

3. The electronic device of claim 1, wherein the instructions, when executed, cause the processor to:
generate at least one speaker model corresponding to at least one specified speaker to store the at least one speaker model in a database.

4. The electronic device of claim 3, wherein the instructions, when executed, cause the processor to:
when voice data associated with the first utterance corresponds to at least one of the at least one speaker model stored in the database, activate a speech recognition service function, which is embedded in the electronic device or provided from an external server, in response to receiving the first utterance.

5. The electronic device of claim 4, wherein the instructions, when executed, cause the processor to:
determine a speaker model corresponding to the voice data associated with the first utterance to store the speaker model in a cache memory.

6. The electronic device of claim 5, wherein the instructions, when executed, cause the processor to:
when voice data associated with the second utterance corresponds to at least one of the speaker model stored in the cache memory or the at least one speaker model stored in the database, determine the voice section and the noise section.

7. The electronic device of claim 6, wherein the instructions, when executed, cause the processor to:
transmit a part of the voice data correspond to the voice section to the external server.

8. The electronic device of claim 5, wherein the instructions, when executed, cause the processor to:
when the voice data associated with the second utterance does not correspond to the speaker model stored in the cache memory or the at least one speaker model stored in the database, delete the speaker model stored in the cache memory after a specified time elapses.

9. A method for processing a user voice input of an electronic device, the method comprising:
receiving a first utterance through a microphone mounted on the electronic device;
determining a speaker model by performing speaker recognition on the first utterance;
receiving a second utterance through the microphone after the first utterance is received;

determining a plurality of sections including voice information from voice data associated with the second utterance;

determining a section correspond to the speaker model among the plurality of sections, as a voice section of the voice data; and determining others section does not correspond to the speaker model among the plurality of sections, as a noise section of the voice data.

10. The method of claim 9, wherein the first utterance includes at least one predetermined wake-up word and wherein the second utterance includes an utterance including a command or intent associated with a task to be performed through the electronic device.

* * * * *